US010027396B2

(12) United States Patent
Park et al.

(10) Patent No.: US 10,027,396 B2
(45) Date of Patent: Jul. 17, 2018

(54) METHOD OF MEASURING CSI IN WIRELESS COMMUNICATION SYSTEM SUPPORTING UNLICENSED BANDS AND APPARATUS SUPPORTING THE SAME

(71) Applicant: LG ELECTRONICS INC., Seoul (KR)

(72) Inventors: Hanjun Park, Seoul (KR); Joonkui Ahn, Seoul (KR); Seonwook Kim, Seoul (KR); Suckchel Yang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/343,980

(22) Filed: Nov. 4, 2016

(65) Prior Publication Data
US 2017/0126300 A1    May 4, 2017

Related U.S. Application Data

(60) Provisional application No. 62/250,523, filed on Nov. 4, 2015.

(51) Int. Cl.
| | |
|---|---|
| *H04W 4/10* | (2009.01) |
| *H04B 7/06* | (2006.01) |
| *H04B 17/345* | (2015.01) |
| *H04L 5/00* | (2006.01) |
| *H04W 88/02* | (2009.01) |
| *H04W 88/08* | (2009.01) |
| *H04W 74/08* | (2009.01) |
| *H04L 27/26* | (2006.01) |
| *H04J 11/00* | (2006.01) |

(52) U.S. Cl.
CPC ......... *H04B 7/0626* (2013.01); *H04B 17/345* (2015.01); *H04L 5/0048* (2013.01); *H04W 4/10* (2013.01); *H04J 11/0023* (2013.01); *H04L 27/2601* (2013.01); *H04W 74/0833* (2013.01); *H04W 88/02* (2013.01); *H04W 88/08* (2013.01)

(58) Field of Classification Search
CPC . H04W 74/0833; H04W 88/08; H04W 88/02; H04W 4/10; H04J 11/0023; H04B 7/0626; H04B 17/345; H04L 5/0048; H04L 27/2601
USPC ... 455/561, 554.2, 403, 410, 518, 508, 90.2, 455/520, 519; 709/204; 370/462, 461, 370/448, 447, 446, 445, 310.2
See application file for complete search history.

(56) References Cited

U.S. PATENT DOCUMENTS

2016/0337101 A1*  11/2016  Gao .................. H04L 5/0082
2018/0048428 A1*  2/2018  Kim ................. H04W 72/042

* cited by examiner

*Primary Examiner* — Inder Mehra
(74) *Attorney, Agent, or Firm* — Birch, Stewart, Kolasch & Birch, LLP

(57) ABSTRACT

The present invention discloses a channel state information (CSI) measurement method through which a user equipment (UE) recognizes a resource pattern applied to a current CSI measurement resource through blind detection or dynamic signaling and performs CSI measurement when an evolved Node B (eNB) or the UE performs LBT (Listen-Before-Talk) based signal transmission and the eNB transmits CSI measurement resources (e.g., CRS/CSI-RS/CSI-IM) by applying one of a plurality of resource patterns thereto, and a UE performing the same.

12 Claims, 17 Drawing Sheets

FIG. 10
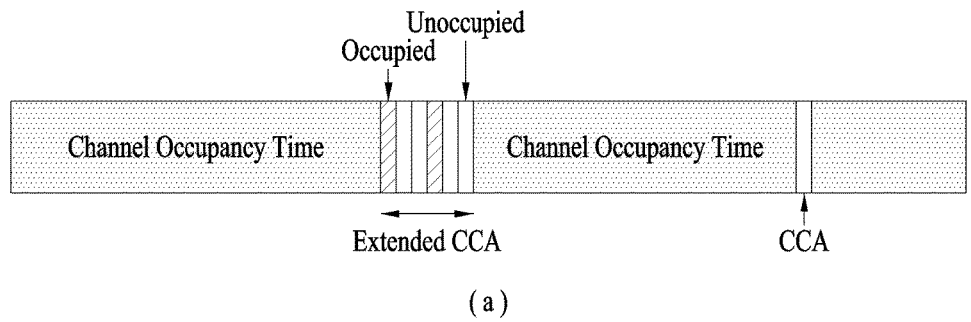
(a)
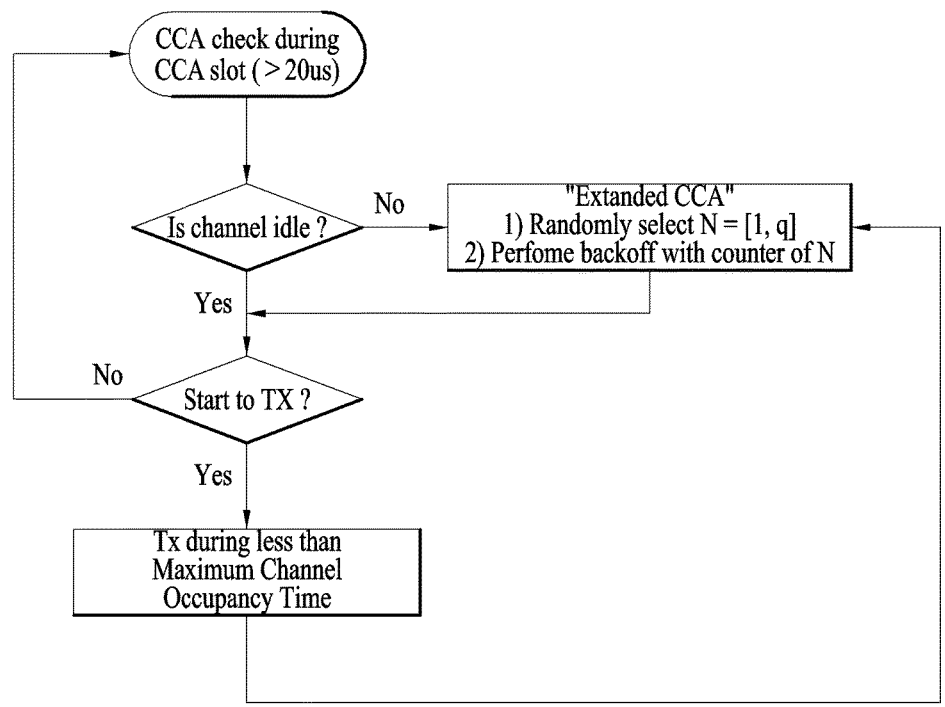
(b)

FIG. 13
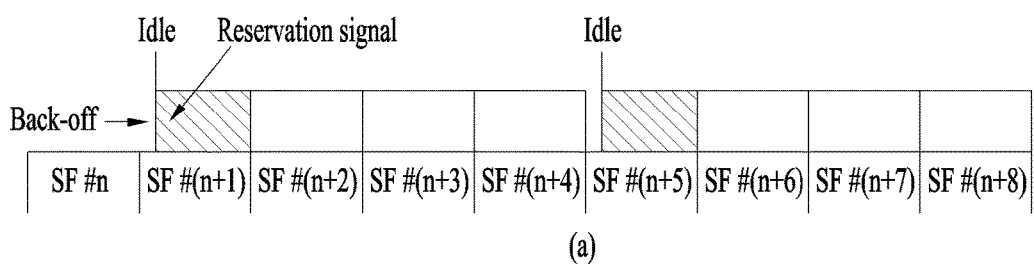
(a)
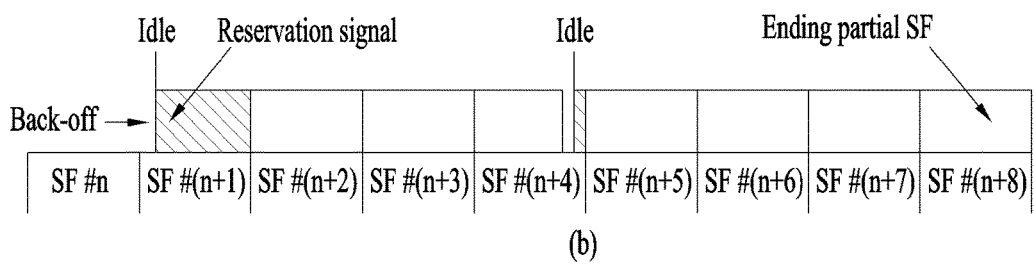
(b)

METHOD OF MEASURING CSI IN WIRELESS COMMUNICATION SYSTEM SUPPORTING UNLICENSED BANDS AND APPARATUS SUPPORTING THE SAME

This application claims the benefit of U.S. Provisional Application No. 62/250,523, filed on Nov. 4, 2015, in the U.S. Patent and Trademark Office, the disclosure of which are incorporated herein in its entirety by reference.

BACKGROUND OF THE INVENTION

Field of the Invention

The following description relates to a wireless communication system supporting unlicensed bands and, more particularly, a method of measuring channel state information (CSI) by a user equipment (UE) by detecting or recognizing a resource pattern of CSI measurement resources (e.g., CRS/CSI-RS/CSI-IM) transmitted from an evolved Node B (eNB) and apparatuses for supporting the same.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

SUMMARY OF THE INVENTION

An object of the present invention is to provide a method through which a UE efficiently measures channel state information (CSI) by detecting a resource pattern of CSI measurement resources (CRS/CSI-RS/CSI-IM) transmitted from an eNB.

Particularly, an object of the present invention is to provide a method through which a UE efficiently measures CSI by detecting a resource pattern of CSI measurement resources included in a series of signals when a transmission (TX) burst through which an eNB or the UE transmits the series of signals is transmitted in an ending partial subframe having a transmission time interval (TTI) shorter than 1 ms.

It will be appreciated by persons skilled in the art that the objects that could be achieved with the present invention are not limited to what has been particularly described hereinabove and the above and other objects that the present invention could achieve will be more clearly understood from the following detailed description.

According to a method of measuring channel state information (CSI) to accomplish the objects, a user equipment (UE) receives, from an evolved Node B (eNB), CSI resource configuration information indicating one of CSI measurement resource patterns respectively set for numbers of consecutive orthogonal frequency division multiplexing (OFDM) symbols associated with CSI measurement and measures CSI for one or more subframes using a CSI measurement resource pattern indicated by the CSI resource configuration information.

CSI measurement resources of the CSI measurement resource patterns may comprise one or more of cell specific reference signal (CRS), a channel state information-reference signal (CSI-RS) and channel state information-interference measurement (CSI-IM) resources.

The CSI resource configuration information may indicate one of CSI measurement resource patterns respectively set for a plurality of states shown in the following table, and each of the one or more subframes may comprise OFDM symbols #0 to #13 in the time domain.

TABLE

| State | Description |
|---|---|
| 1 | A case in which the consecutive OFDM symbols associated with CSI measurement correspond to OFDM symbols #0 to #5 in each of the one or more subframes |
| 2 | A case in which the consecutive OFDM symbols associated with CSI measurement correspond to OFDM symbols #0 to #8 or #0 to #9 in each of the one or more subframes |
| 3 | A case in which the consecutive OFDM symbols associated with CSI measurement correspond to OFDM symbols #0 to #10 or #0 to # 11 in each of the one or more subframes |
| 4 | A case in which the consecutive OFDM symbols associated with CSI measurement correspond to all OFDM symbols in each of the one or more subframes |
| 5 | A case in which consecutive OFDM symbols associated with CSI measurement correspond to OFDM symbols #0 to #11 in each of the one or more subframes, but a SSS (Secondary Synchronization Signal) and PSS (Primary Synchronization Signal) are respectively allocated to OFDM symbols #5 and #6 in a frequency band corresponding to 6 RBs (resource blocks) in the entire frequency |

Each of the one or more subframes may comprise subcarriers #0 to #11 in the frequency domain, a CSI measurement resource pattern set according to state 1 indicates a CSI resource pattern comprising the CSI-RS resource is assigned to subcarriers #2, #3, #8 and #9 on OFDM symbols #2 and #3 of each of the one or more subframes, a CSI measurement resource pattern set according to state 2 indicates a CSI resource pattern comprising the CSI-RS resource is assigned to subcarriers #2, #3, #8 and #9 on OFDM symbols #2 and #3 and subcarriers #2, #3, #8 and #9 on OFDM symbols #5 and #6 of each of the one or more subframes, a CSI measurement resource pattern set according to state 3 indicates a CSI resource pattern comprising the CSI-RS resource is assigned to subcarriers #2, #3, #8 and #9 on OFDM symbols #9 and #10 of each of the one or more.

When the CSI resource configuration information is not received from the eNB, the UE may measure a number of consecutive OFDM symbols carrying data transmitted in a subframe corresponding to a time appointed to receive the CSI resource configuration information on the basis of position information of a CRS detected in the subframe and measure CSI for the one or more subframes using a CSI measurement resource pattern determined on the basis of the measured number of consecutive OFDM symbols.

According to a method of measuring channel state information (CSI) to accomplish the objects, a user equipment (UE) receives, from an evolved Node B (eNB), subframe configuration information indicating whether a specific subframe is a partial subframe carrying data transmitted only through some orthogonal frequency division multiplexing (OFDM) symbols, measures a length of data transmitted from the eNB in the specific subframe on the basis of position information of a cell specific reference signal (CRS) detected in the specific subframe, measures CSI for one or more subframes including the specific subframe using a CSI measurement resource pattern determined on the basis of the measured data length when the subframe configuration information indicates that the specific subframe is the partial subframe and measures CSI for one or more subframes including the specific subframe using a predetermined CSI measurement resource pattern when the subframe configuration information indicates that the specific subframe is not the partial subframe.

CSI measurement resources of the CSI measurement resource pattern may comprise a channel state information-reference signal (CSI-RS) resource, each of the one or more subframes may comprise OFDM symbols #0 to #13 in the time domain, the CSI measurement resource pattern may be determined as a CSI measurement resource pattern in which the CSI-RS resource is assigned to OFDM symbols #2 and #3 of each of the one or more subframes when the CRS is detected in OFDM symbols #0 and #4 of the specific subframe, the CSI measurement resource pattern may be determined as a CSI measurement resource pattern in which the CSI-RS resource is assigned to OFDM symbols #2, #3, #5 and #6 of each of the one or more subframes when the CRS is detected in OFDM symbols #0, #4 and #7 of the specific subframe and the CSI measurement resource pattern may be determined as a CSI measurement resource pattern in which the CSI-RS resource is assigned to OFDM symbols #2, #3, #5, #6, #9 and #10 of each of the one or more subframes when the CRS is detected in OFDM symbols #0, #4, #7 and #11 of the specific subframe.

A user equipment (UE) to accomplish the objects includes a receiver and a processor operating by being connected to the receiver, wherein the processor is configured to receive, from an evolved Node B (eNB), channel state information (CSI) resource configuration information indicating one of CSI measurement resource patterns respectively set for numbers of consecutive orthogonal frequency division multiplexing (OFDM) symbols associated with CSI measurement and to measure CSI for one or more subframes using a CSI measurement resource pattern indicated by the CSI resource configuration information.

A user equipment (UE) to accomplish the objects includes a receiver and a processor operating by being connected to the receiver, wherein the processor is configured to receive, from an evolved Node B (eNB), subframe configuration information indicating whether a specific subframe is a partial subframe carrying data transmitted only through some orthogonal frequency division multiplexing (OFDM) symbols, to measure a length of data transmitted from the eNB in the specific subframe on the basis of position information of a cell specific reference signal (CRS) detected in the specific subframe, to measure channel state information (CSI) for one or more subframes including the specific subframe using a CSI measurement resource pattern determined on the basis of the measured data length when the subframe configuration information indicates that the specific subframe is a partial subframe and to measure CSI for one or more subframes including the specific subframe using a predetermined CSI measurement resource pattern when the subframe configuration information indicates that the specific subframe is not a partial subframe.

The afore-described aspects of the present invention are merely a part of preferred embodiments of the present invention. Those skilled in the art will derive and understand various embodiments reflecting the technical features of the present invention from the following detailed description of the present invention.

According to the embodiments of the present invention, the following effects can be achieved.

Firstly, even when a resource pattern of CSI measurement resources transmitted from an eNB changes in a wireless access system supporting unlicensed bands, a UE can measure CSI in response to the resource pattern change.

Secondly, the UE can recognize the resource pattern of the CSI measurement resources transmitted from the eNB and measure CSI on the basis of the resource pattern while minimizing signaling overhead between the UE and the eNB.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 10 illustrates an example of an LBE operation included in the LBT procedure;

FIG. 13 is a diagram for comparing a case in which an ending partial subframe is not applied with a case in which the ending partial subframe is applied;

DETAILED DESCRIPTION OF THE INVENTION

Figure 1:
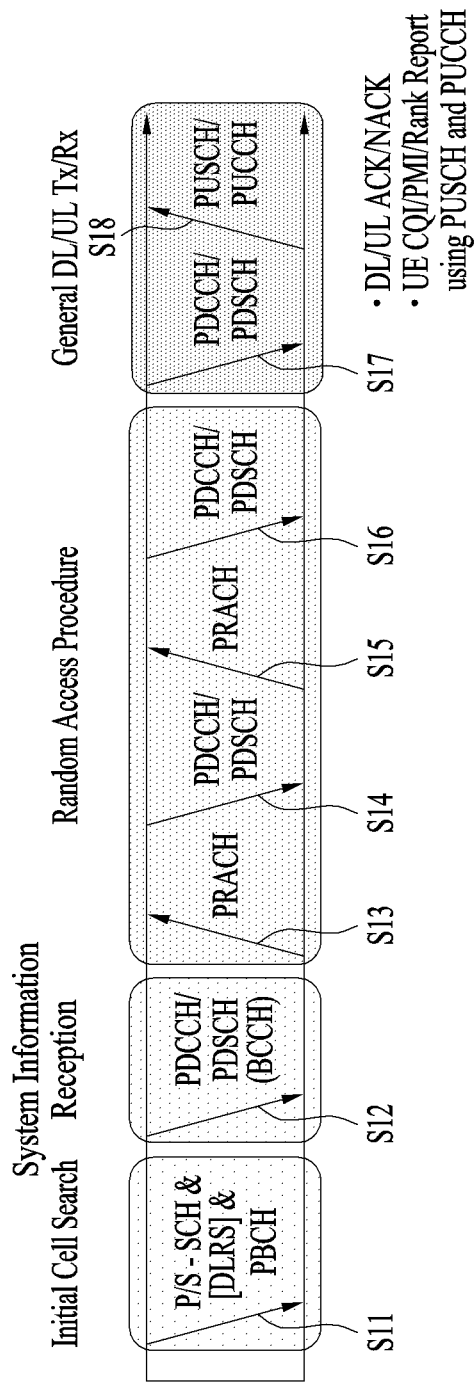
FIG. 1 illustrates physical channels and a general signal transmission method using the physical channels, which may be used in embodiments of the present invention.

Embodiments of the present invention described below in detail provide a method for transmitting and receiving a data symbol using a correlation between antennas that form a massive antenna, and apparatuses supporting the method.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when it is said that some part "comprises" or "includes" a specific element, this means that the part may further include other elements unless otherwise mentioned. The terms "-er(or)", "module", "portion" and "part" are used to signify a unit of performing at least one function or operation. The unit can be realized in hardware, software, or in combination thereof. Further, "a", "an" "one" and "the" are intended to include the plural forms as well, unless the context clearly indicates otherwise.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term "Transmission Opportunity Period (TxOP)" can mean the same thing as "transmission period", "TX burst" or "Reserved Resource Period (RRP)". Furthermore, an LBT (Listen Before Talk) procedure can be performed for the same purpose as a carrier sensing procedure, clear channel assessment (CCA) and channel access procedure (CAP) for determining whether a channel state is idle.

A description will be given of a 3GPP LTE/LTE-A system as an exemplary wireless access system to which embodiments of the present invention are applicable.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
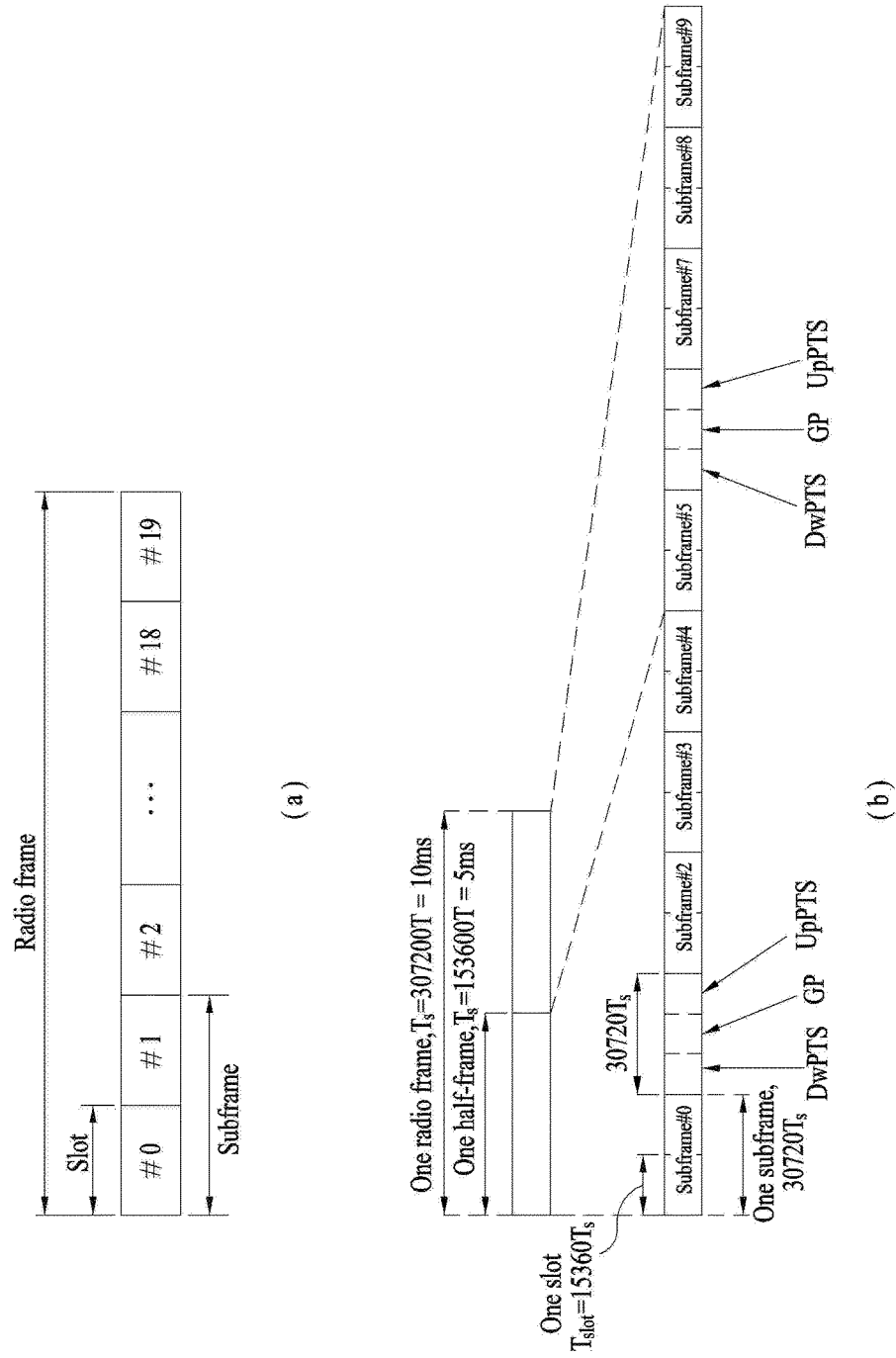
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($Tf=307200 \cdot T_s$) long, including equal-sized 20 slots indexed from 0 to 19. Each slot is 0.5 ms ($Tslot=15360 \cdot T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $Ts=1/(15 \text{ kHz} \times 2048)=3.2552 \times 10-8$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($Tf=307200 \cdot Ts$) long, including two half-frames each having a length of 5 ms ($=153600 \cdot Ts$) long. Each half-frame includes five subframes each being 1 ms ($=30720 \cdot Ts$) long. An ith subframe includes 2ith and (2i+1)th slots each having a length of 0.5 ms ($Tslot=15360 \cdot Ts$). Ts is a sampling time given as $Ts=1/(15 \text{ kHz} \times 2048)=3.2552 \times 10-8$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
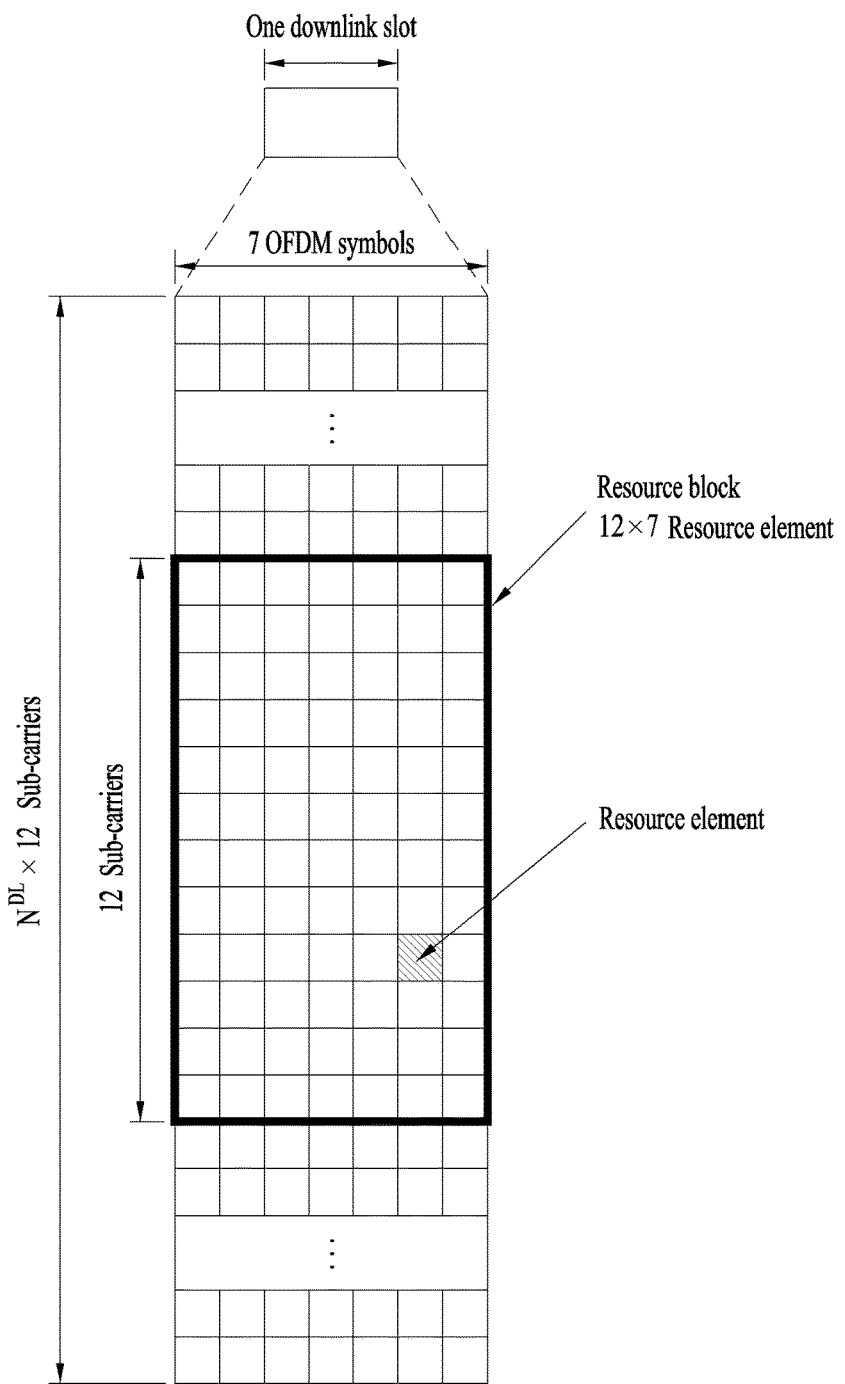
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7

OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
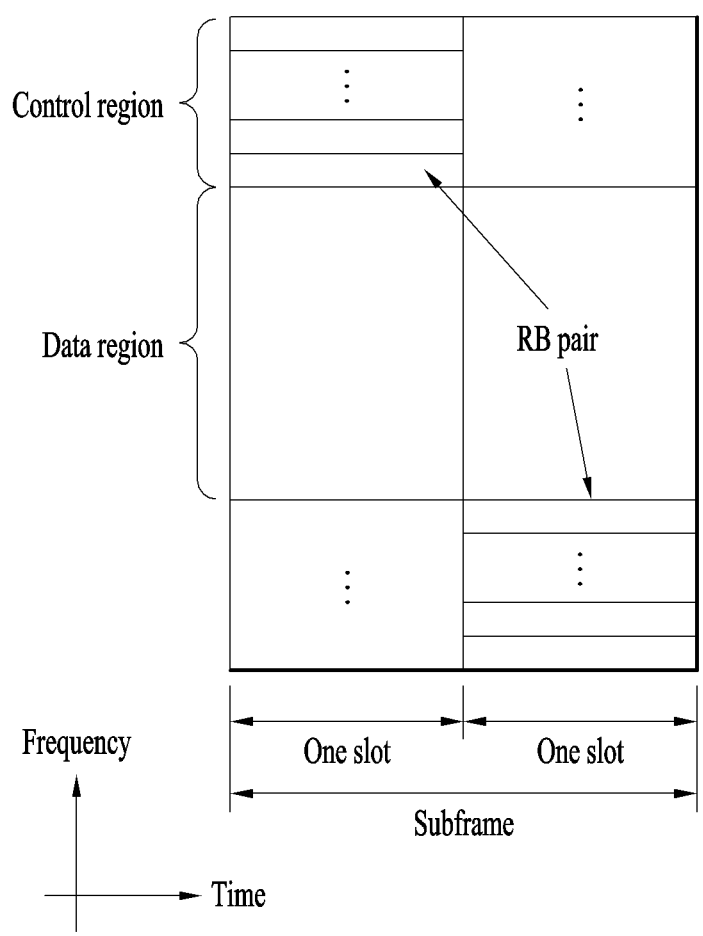
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
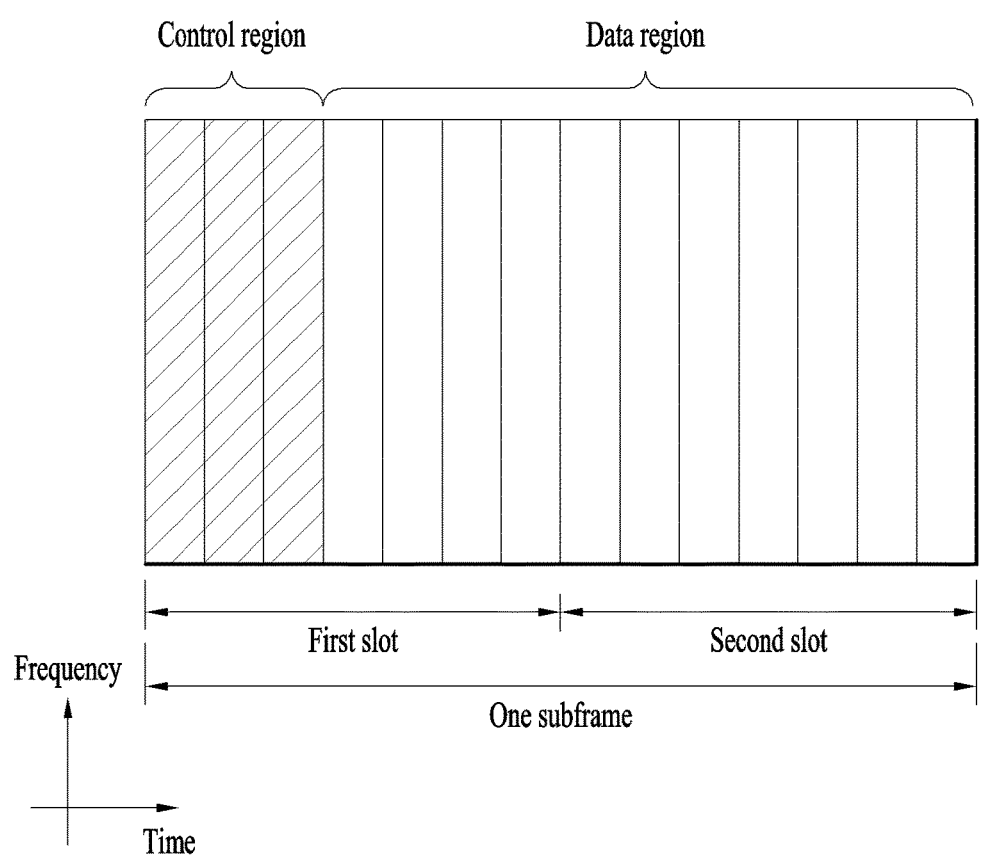
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated, DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group. Embodiments of the present invention described below in detail provide a method for transmitting and receiving a data symbol using a correlation between antennas that form a massive antenna and apparatuses supporting the method.

1.2 CSI (Channel State Information) Feedback Through PUCCH

First of all, in the 3GPP LTE system, when a DL reception entity (e.g., a user equipment) is connected to a DL transmission entity (e.g., a base station), the DL reception entity performs measurement on a reference signal received power (RSRP) of a reference signal transmitted in DL, a quality of a reference signal (RSRQ: reference signal received quality) and the like at a random time and is then able to make a periodic or even-triggered report of a corresponding measurement result to the base station.

Each user equipment reports a DL channel information in accordance with a DL channel status via uplink. A base station is then able to determine time/frequency resources, MCS (modulation and coding scheme) and the like appropriate for a data transmission to each user equipment using the DL channel information received from the each user equipment.

Such channel state information (CSI) may include CQI (Channel Quality Indication), PMI (Precoding Matrix Indicator), PTI (Precoder Type Indication) and/or RI (Rank Indication). In particular, the CSI may be transmitted entirely or partially depending on a transmission mode of each user equipment. CQI is determined based on a received signal quality of a user equipment, which may be generally determined on the basis of a measurement of a DL reference signal. In doing so, a CQI value actually delivered to a base station may correspond to an MCS capable of providing maximum performance by maintaining a block error rate (BLER) under 10% in the received signal quality measured by a user equipment.

This channel information reporting may be classified into a periodic report transmitted periodically and an aperiodic report transmitted in response to a request made by a base station.

In case of the aperiodic report, it is set for each user equipment by a 1-bit request bit (CQI request bit) contained in UL scheduling information downloaded to a user equipment by a base station. Having received this information, each user equipment is then able to deliver channel information to the base station via a physical uplink shared channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each user equipment by subframe unit and channel information in consideration of a transmission mode of each user equipment may be delivered to a base station via a physical uplink control channel (PUCCH) in accordance with a determined period. In case that data transmitted in uplink simultaneously exists in a subframe in which channel information is transmitted by a determined period, the corresponding channel information may be transmitted together with the data not on the physical uplink control channel (PUCCH) but on a physical uplink shared channel (PUSCH). In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 2 is provided to describe CSI feedback type transmitted on PUCCH and PUCCH CSI report mode.

TABLE 2

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label) | Mode 2-1<br>RI<br>Wideband CQI (4 bit)<br>Wideband spatial CQI (3 bit) for RI > 1<br>Wideband PMI (4 bit)<br>Best-1 CQI (4 bit)<br>1 in each BP |

TABLE 2-continued

| PMI Feedback Type | |
|---|---|
| No PMI (OL, TD, single-antenna) | Single PMI (CL) |
| when RI > 1, CQI of first codeword | Best-1 spatial CQI (3 bit) for RI > 1 Best-1 indicator (L-bit label) |

Referring to Table 2, in the periodic report of channel information, there are 4 kinds of reporting modes (mode 1-0, mode 1-2, mode 2-0 and mode 2-1) in accordance with CQI and PMI feedback types.

CQI can be classified into WB (wideband) CQI and SB (subband) CQI in accordance with CQI feedback type and PMI can be classified into No PMI or Single PMI in accordance with a presence or non-presence of PMI transmission. In Table 11, No PMI corresponds to a case of open-loop (OL), transmit diversity (TD) and single-antenna, while Single PMI corresponds to a case of closed-loop (CL).

The mode 1-0 corresponds to a case that WB CQI is transmitted in the absence of PMI transmission. In this case, RI is transmitted only in case of open-loop (OL) spatial multiplexing (SM) and one WB CQI represented as 4 bits can be transmitted. If RI is greater than 1, CQI for a 1st codeword can be transmitted.

The mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB (wideband) spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

The mode 2-0 corresponds to a case that CQI on a UE-selected band is transmitted in the absence of PMI transmission. In this case, RI is transmitted only in case of open-loop spatial multiplexing (SM) and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQT for a 1st codeword can be transmitted.

And, the mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each bandwidth part (BP) and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.
1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a user equipment is set to make a PMI/RI reporting, or Modes 1-0 and 2-0 if a user equipment is set not to make a PMI/RI reporting
9) Transmission mode 9: Modes 1-1 and 2-1 if a user equipment is set to make a PMI/RI reporting and the number of CSI-RS ports is greater than 1, or Modes 1-0 and 2-0 if a user equipment is set not to make a PMI/RI reporting and the number of CSI-RS port(s) is equal to 1.

The periodic PUCCH CSIU reporting mode in each serving cell is set by upper layer signaling. And, the mode 1-1 is set to either submode 1 or submode 2 by an upper layer signaling using a parameter 'PUCCH_format1-1 CSI_reporting_mode'.

A CQI reporting in a specific subframe of a specific serving cell in a UE-selected SB CQI means a measurement of at least one channel state of a bandwidth part (BP) corresponding to a portion of a bandwidth of a serving cell. An index is given to the bandwidth part in a frequency increasing order starting with a lowest frequency without an increment of a bandwidth.

1.3 Reference Signal (RS)

Hereinafter, reference signals that can be used in the embodiments of the present invention will be described.

Figure 6:
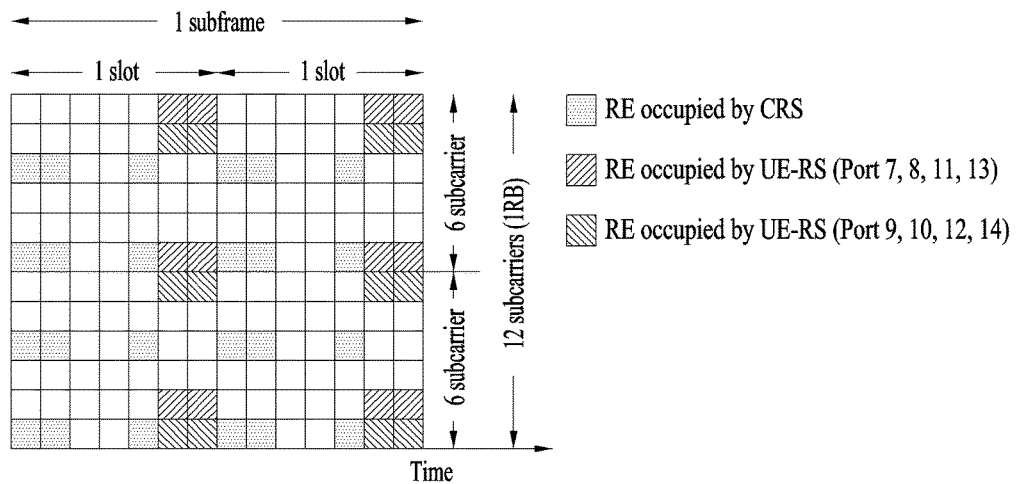
FIG. 6 illustrates an example of a subframe to which a UE-specific reference signal (UE-RS) that can be used in embodiments of the present invention is allocated.

FIG. 6 illustrates an example of a subframe to which a UE-specific reference signal (UE-RS) that can be used in embodiments of the present invention is allocated.

FIG. 6 illustrates REs occupied by the UE-RS from among REs in resource block pairs of a normal downlink subframe having a normal CP.

The UE-RS supports transmission of a PDSCH signal and antenna ports p=5, p=7, p=8 or p=7, 8, . . . , υ+6 (υ being the number of layers used to transmit the PDSCH) may be used. The UE-RS is provided when PDSCH transmission is associated with a relevant antenna port and is valid only for demodulation of the PDSCH signal.

The UE-RS is transmitted only on RBs to which the PDSCH signal is mapped. That is, the UE-RS is configured to be transmitted only on RBs to which the PDSCH is mapped in a subframe for which the PDSCH is scheduled, distinguished from a cell-specific reference signal (CRS) configured to be transmitted in every subframe irrespective of presence or absence of the PDSCH. Furthermore, the UE-RS is transmitted only through antenna ports respectively corresponding to layers of the PDSCH, differently from the CRS transmitted through all antenna ports irrespective of the number of layers of the PDSCH. Accordingly, when the UE-RS is used, RS overhead can be reduced compared to the CRS. Refer to TS 36.211 and 36.213 of 3GPP LTE-A for details of the CRS and UE-RS.

In the 3GPP LTE-A system, the UE-RS is defined in a PRB pair. Referring to FIG. 6, part of a UE-RS sequence is mapped to complex modulation symbols in a specific subframe in a PRB having a frequency-domain index nPRB assigned for PDSCH transmission for p=7, p=8 or p=7, 8, . . . , υ+6.

The UE-RS is transmitted through antenna ports respectively corresponding to layers of the PDSCH. That is, the number of UE-RS ports is proportional to the transmission rank of the PDSCH. 12 REs are used for UE-RS transmission per RB pair when the number of layers is 1 or 2 and 24 REs are used for UE-RS transmission per RB pair when the number of layers is 2 or more. In addition, positions of REs (i.e., UE-RS REs) occupied by the UE-RS in an RB pair are identical in UE-RS ports irrespective of a UE or a cell.

Consequently, the number of DM-RS REs is identical in RBs to which a PDSCH for a specific UE is mapped in a specific subframe. However, the number of DM-RS REs included in RBs allocated to different UEs in the same subframe may vary according to the number of transmitted layers.

In embodiments of the present invention, the UE-RS can be the same as the DM-RS.

2. LTE-U System 2.1 LTE-U System Configuration

Hereinafter, methods for transmitting and receiving data in a carrier aggregation environment of an LTE-A band corresponding to a licensed band and an unlicensed band will be described. In the embodiments of the present invention, an LTE-U system means an LTE system that supports such a CA status of a licensed band and an unlicensed band. A WiFi band or Bluetooth (BT) band may be used as the unlicensed band. An LTE-A system operating in unlicensed bands is referred to as licensed assisted access (LAA). LAA may refer to a scheme of performing data transmission and reception in unlicensed bands combined with licensed bands.

Figure 7:
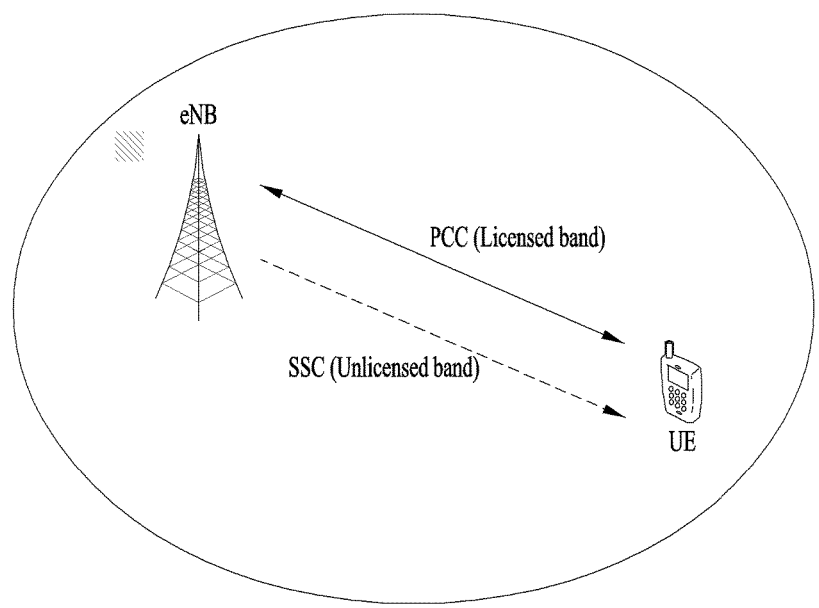
FIG. 7 illustrates an example of a CA environment supported in an LTE-U system.

FIG. 7 illustrates an example of a CA environment supported in an LTE-U system.

Hereinafter, for convenience of description, it is assumed that a UE is configured to perform wireless communication in each of a licensed band and an unlicensed band by using two component carriers (CCs). The methods which will be described hereinafter may be applied to even a case where three or more CCs are configured for a UE.

In the embodiments of the present invention, it is assumed that a Licensed CC (LCC) of the licensed band may be a primary CC (PCC or Pcell), and a Unlicensed CC (UCC) of the unlicensed band may be a secondary CC (SCC or Scell). However, the embodiments of the present invention may be applied to even a case where a plurality of licensed bands and a plurality of unlicensed bands are used in a carrier aggregation method. Also, the methods suggested in the present invention may be applied to even a 3GPP LTE system and another system.

In FIG. 7 one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 7 is only example, and the embodiments of the present invention may be applied to even a CA environment that one UE accesses a plurality of eNBs.

For example, the UE may configure a macro cNB (M-cNB) and a Pcell, and may configure a small eNB (S-eNB) and an Scell. At this time, the macro eNB and the small eNB may be connected with each other through a backhaul network.

In the embodiments of the present invention, the unlicensed band may be operated in a contention-based random access method. At this time, the eNB that supports the unlicensed band may perform a carrier sensing (CS) procedure prior to data transmission and reception. The CS procedure determines whether a corresponding band is reserved by another entity.

For example, the eNB of the Scell checks whether a current channel is busy or idle. If it is determined that the corresponding band is idle state, the eNB may transmit a scheduling grant to the UE to allocate a resource through (E)PDCCH of the Pcell in case of a cross carrier scheduling mode and through PDCCH of the Scell in case of a self-scheduling mode, and may try data transmission and reception.

At this time, the eNB may configure a transmission opportunity (TxOP) period comprised of M consecutive subframes. In this case, a value of M and a use of the M subframes may previously be notified from the eNB to the UE through higher layer signaling through the Pcell or through a physical control channel or physical data channel.

2.2 Carrier Sensing Procedure

In embodiments of the present invention, the CS procedure may be called a clear channel assessment (CCA) procedure or a channel access procedure and may determine whether a relevant channel is busy or idle on the basis of a CCA threshold value predetermined or set through a higher layer signal. For example, when energy exceeding the CCA threshold value is detected in an SCell corresponding to an unlicensed band, it is possible to determine that a corresponding channel is busy or idle. Here, when the channel state is determined to be idle, an eNB can start signal transmission in the SCell. Such processes can be referred to as LBT (Listen-Before-Talk).

Figure 8:
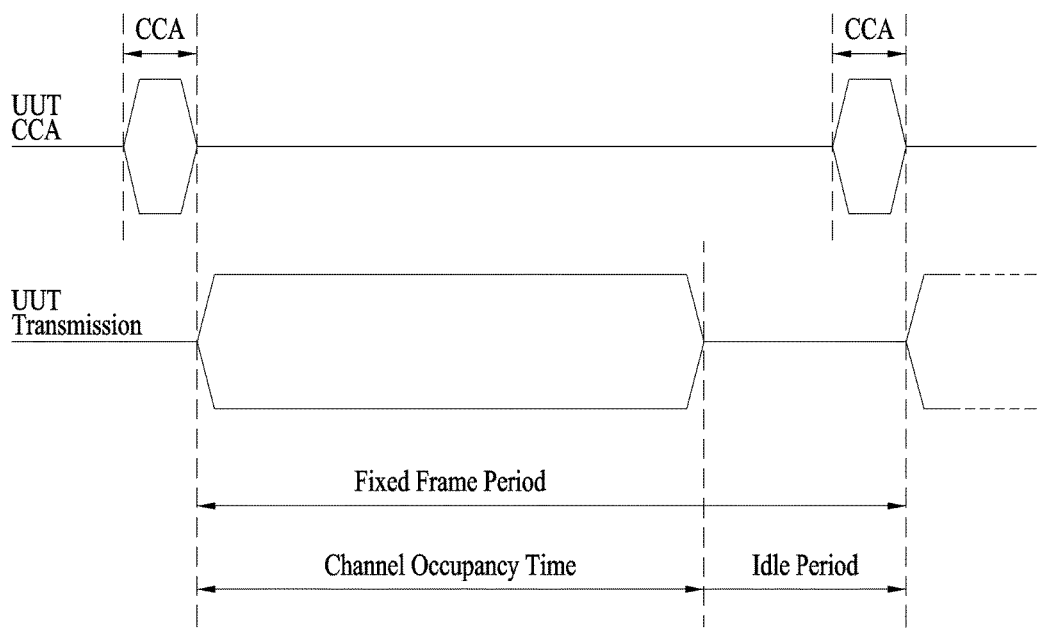
FIG. 8 illustrates an example of an FBE operation included in an LBT procedure.

FIG. 8 illustrates an example of a frame based equipment (FBE) operation included in the LBT procedure.

European ETSI regulation, EN 301 893 V1.7.1, describes two LBT operations called FBE (Frame Based Equipment) and LBE (Load Based Equipment). FBE is defined as an operation in which a channel occupancy time (e.g., 1 to 10 ms) that represents a time for which a communication node can continue transmission when the communication node has successfully performed channel access and an idle period corresponding to at least 5% of the channel occupancy time form one fixed frame and CCA observes the channel for a CCA slot (at least 20 μs) at the end of the idle period.

Here, the communication node periodically performs CCA in units of fixed frame. If the channel is unoccupied, the communication node transmits data for the channel occupancy time. If the channel is occupied, the communication node defers transmission and waits for the CCA slot of the next period.

Figure 9:
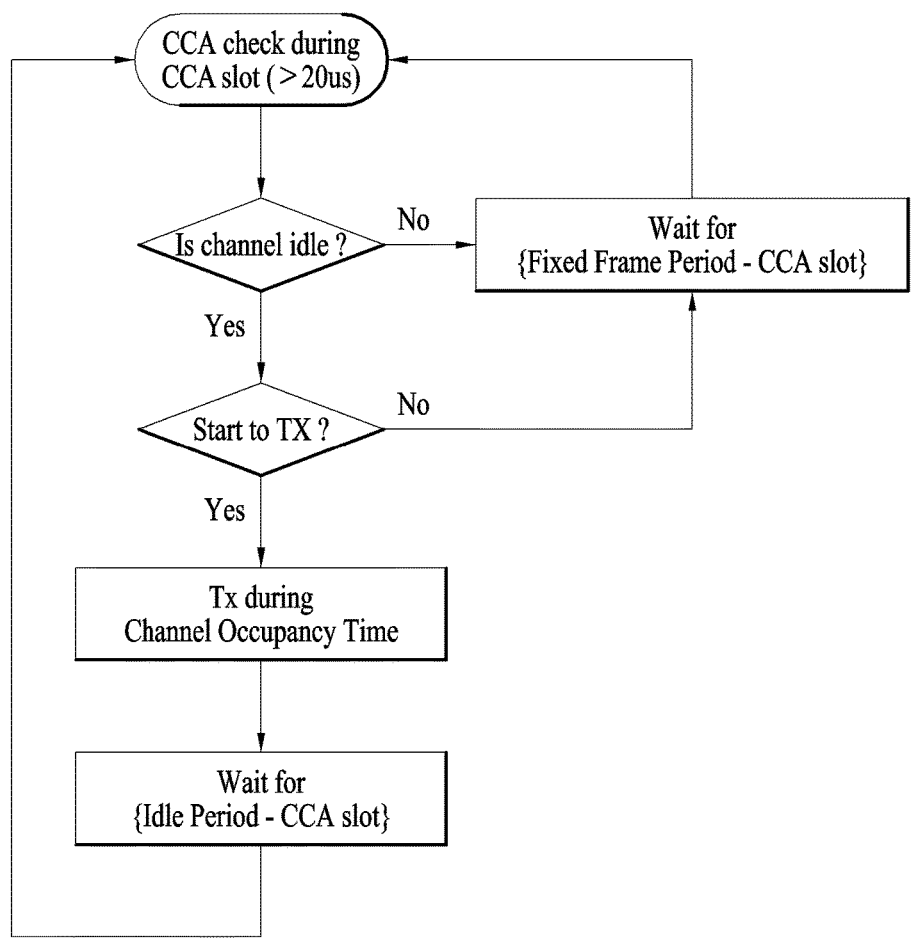
FIG. 9 is a flowchart illustrating the FBE operation.

FIG. 9 is a flowchart illustrating the FBE operation.

Referring to FIG. 9, a communication node (i.e., eNB) that manages an Scell performs a CCA procedure for the CCA slot. The communication node performs data transmission (Tx) when a relevant channel is idle and waits for a time corresponding to [fixed frame period–CCA slot] and performs the CCA procedure again when the channel is busy.

The communication node performs data transmission during the channel occupancy time and, when data transmission is terminated, waits for a time corresponding to [idle period–CCA slot] and then performs the CCA procedure again. If the channel is idle or there is no data to be transmitted, the communication node waits for the time corresponding to [fixed frame period–CCA slot] and then performs the CCA procedure again.

FIG. 10 illustrates an example of an LBE operation included in the LBT procedure.

Referring to FIG. 10(a), a communication node sets a value of q{4, 5, . . . , 32} and then performs CCA for one CCA slot in order to perform the LBE operation.

FIG. 10(b) is a flowchart illustrating the LBE operation. The LBE operation will be described with reference to FIG. 10(b).

The communication node may perform the CCA procedure in a CCA slot. If a relevant channel is unoccupied in the first CCA slot, the communication node can secure a time of a maximum of (13/32)q ms and transmit data for the time.

However, if the channel is occupied in the first CCA slot, the communication node randomly collects a value of N∈{1, 2, ..., q} to set a counter value as an initial value, stores the value, and then decreases the set counter value by 1 if the channel is unoccupied in a specific CCA slot while sensing the channel state on a CCA slot basis. When the counter value reaches 0, the communication node can secure a time of a maximum of (13/32)q ms and transmit data for the time.

2.3 Discontinuous Transmission on Downlink

Discontinuous transmission on unlicensed carriers having a limited maximum transmission period may affect some functions necessary for operation of an LTE system. Such functions can be supported by one or more signals transmitted at the start of discontinuous LAA downlink transmission. The functions supported by such signals include AGC setting, channel reservation functions and the like.

In signal transmission by an LAA node, channel reservation refers to transmission of signals to other nodes through acquired channels after channel access through successful LBT operation.

Functions supported by one or more signals for an LAA operation including discontinuous downlink transmission include a function of detecting LAA downlink transmission by a UE and a time and frequency synchronization function of UEs. Here, requirements of such functions do not exclude available other functions and these functions may be supported by other methods.

2.3.1 Time and Frequency Synchronization

Design objectives recommended for the LAA system support acquisition of time and frequency synchronization of a UE through a discovery signal for RRM (Radio Resource Management) measurement and reference signals included in DL transmission bursts or a combination thereof. The discovery signal for RRM measurement, transmitted in a serving cell, is used to acquire at least coarse time or frequency synchronization.

2.3.2 Downlink Transmission Timing

In DL LAA design, subframe boundary adjustment may depend on a CA timing relation between serving cells combined by CA defined in LTE-A (Rel-12 or below). However, this does not mean that an eNB starts DL transmission only at a subframe boundary. The LAA system can support PDSCH transmission even when all OFDM symbols are not available in one subframe depending on a result of an LBT procedure. Here, transmission of control information necessary for PDSCH transmission needs to be supported.

2.4 RRM Measurement and Report

LTE-A can transmit a discovery signal at a start time for supporting RRM functions including cell detection. Here, the discovery signal may be called a discovery reference signal (DRS). To support RRM functions for LAA, the discovery signal of LTE-A and functions of transmitting and receiving the discovery signal may be modified and applied.

2.4.1 Discovery Reference Signal (DRS)

The DRS of LTE-A was designed to support small cell on/off operations. Here, off small cells mean that most functions except for periodic DRS transmission are off. The DRS is transmitted in a DRS transmission occasion at intervals of 40, 80 or 160 ms. A discovery measurement timing configuration (DMTC) refers to a time period in which reception of a DRS by a UE can be expected. The DRS transmission occasion can occur anywhere in the DMTC and the UE can expect continuous DRS transmission at the corresponding intervals from a cell assigned thereto.

Use of the DRS of LTE-A in the LAA system may cause new restrictions. For example, some areas permit DRS transmission like very short control transmission without LBT, whereas some other areas do not permit short control transmission without LBT. Accordingly, DRS transmission can be an object of LBT in the LAA system.

If LBT is applied to DRS transmission, the DRS may not be periodically transmitted as in DRS transmission of LTE-A. Accordingly, the following two methods can be considered for DRS transmission for the LAA system.

Firstly, the DRS is transmitted only at a fixed time position within a DMTC on condition of LBT.

Secondly, DRS transmission is permitted at one or more different time positions within a DMTC on condition of LBT.

In another aspect of the second method, the number of time positions may be limited to one time position within one subframe. DRS transmission outside the DMTC may be permitted in addition to DRS transmission within the DMTC if more advantageous.

Figure 11:
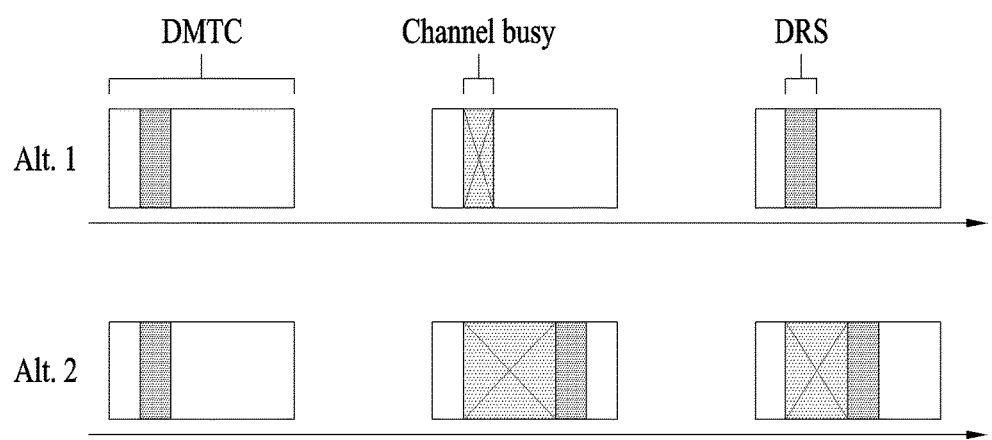
FIG. 11 is a diagram illustrating DRS transmission methods supported by an LAA system.

FIG. 11 is a diagram illustrating DRS transmission methods supported by the LAA system.

Referring to FIG. 11, the upper part of FIG. 11 illustrates the aforementioned first DRS transmission method and the lower part illustrates the second DRS transmission method. That is, a UE can receive a DRS only at fixed positions in a DMTC period in the first method, whereas the UE can receive the DRS at random positions in the DMTC period.

When the UE performs RRM measurement based on DRS transmission in LTE-A, the UE may perform one RRM measurement on the basis of a plurality of DRS opportunities. When the DRS is used in the LAA system, transmission of the DRS at a specific position cannot be ensured because of restrictions due to LBT. If the UE assumes that the DRS is present when the DRS is not actually transmitted from an eNB, quality of RRM measurement results reported by the UE may be deteriorated. Accordingly, LAA DRS design needs to permit detection of the DRS in one DRS opportunity. This can ensure that the UE can combine only successively detected DRS opportunities with RRM measurement performed thereby.

Signals including DRSs do not guarantee transmission of DRSs adjacent in the time domain. That is, if there is no data transmission in subframes involving DRSs, OFDM symbols on which a physical signal is not transmitted may be present. During operation in unlicensed bands, other nodes may sense that a corresponding channel is idle in such a silent period between DRS transmission periods. To avoid this problem, it is desirable to guarantee that transmission bursts are composed of neighbor OFDM symbols on which some signals are transmitted.

2.5 Channel Access Procedure and Contention Window Adjustment Procedure

A description will be given of the aforementioned channel access procedure (CAP) and contention window adjustment (CWA) from the viewpoint of a transmission node.

Figure 12:
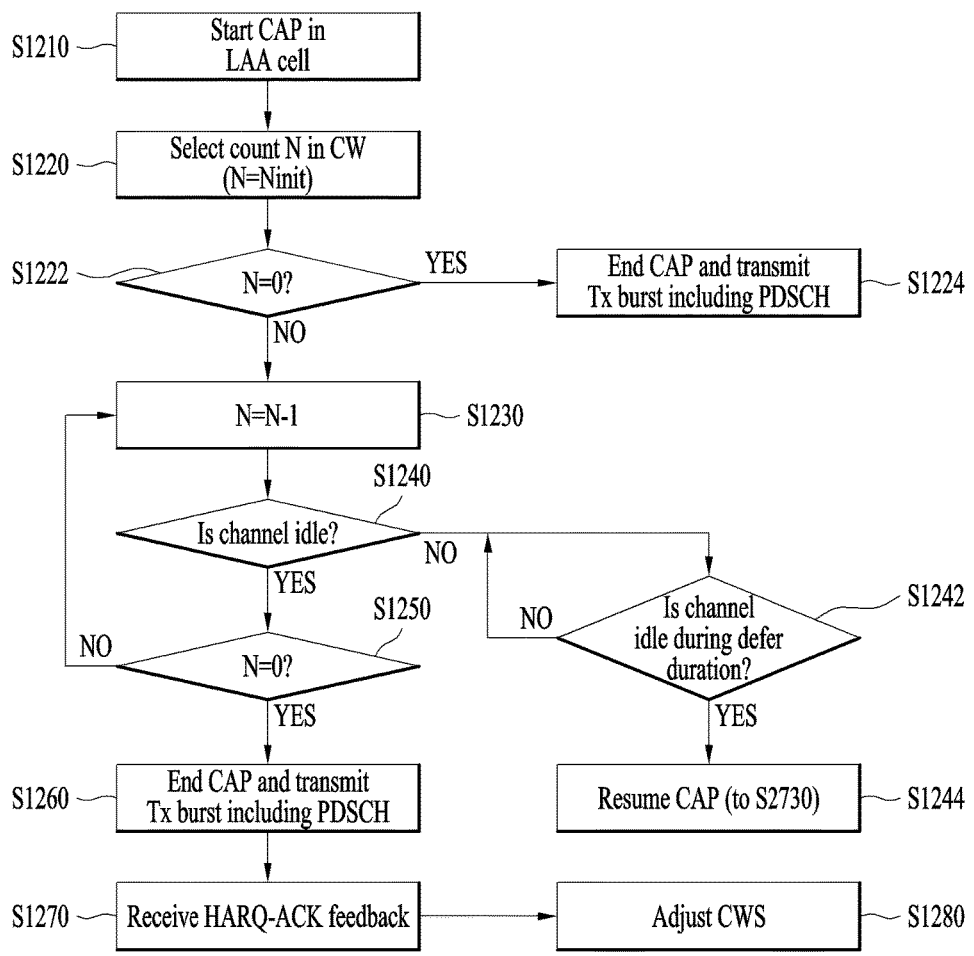
FIG. 12 is a diagram illustrating CAP and CWA.

FIG. 12 illustrates CAP and CWA.

An LTE transmission node (e.g., eNB) may initiate a CAP to operate in LAA S cells corresponding to unlicensed band cells for downlink transmission (S1210).

The eNB may randomly select a backoff counter N within a contention window (CW). Here, N is set to an initial value Ninit (S1220). An arbitrary value in the range of 0 to $CW_p$ is selected as Ninit.

If the backoff counter N is 0 (S1222), the eNB terminates the CAP and transmits a TX burst including a PDSCH (S1224). If the backoff counter is not 0, the eNB decreases the backoff counter by 1 (S1230).

The eNB checks whether a channel of an LAA S cell is idle (S1240). When the channel is idle, the eNB checks whether the backoff counter is 0 (S1250). The eNB repeatedly checks whether the channel is idle while decreasing the backoff counter by 1 until the backoff counter reaches 0.

If the channel is not idle in step S1240, that is, if the channel is busy, the eNB checks whether the channel is idle during a defer duration $T_d$ (25 μs or longer) longer than a slot duration (e.g., 9 μs) (S1242). When the channel is idle during the defer duration, the eNB can resume the CAP (S1244). For example, if the backoff counter Ninit is 10 and the channel is determined to be busy after the backoff counter decreases to 5, the eNB senses the channel during the defer duration to determine whether the channel is idle. Here, if the channel is idle during the defer duration, the eNB can resume the CAP from the backoff counter 5 (or decrease the backoff counter to 1 and then resume the CAP from backoff counter 4) instead of setting the backoff counter Ninit. Conversely, if the channel is busy during the defer duration, the eNB performs step S1242 again to check whether the channel is idle for a new defer duration.

Referring back to FIG. 12, the eNB determines whether the backoff counter N reaches 0 (S1250). When the backoff counter reaches 0, the eNB can terminate the CAP and transmit a TX burst including a PDSCH (S1260).

The eNB may receive HARQ-ACK information about the TX burst from a UE (S1270). The eNB may adjust a contention window size (CWS) on the basis of the received HARQ-ACK information (S1280).

In step S1280, the eNB may adjust the CWS on the basis of HARQ-ACK information about the first subframe of a most recently transmitted TX burst (i.e., the start subframe of the TX burst).

Here, the eNB may set an initial CW for each priority class prior to CWP. Then, the eNB permits CW values set to respective priority classes and then increases the CW values to next priority levels when a probability that HARQ-ACK values corresponding to PDSCHs transmitted in reference subframes are determined as NACK is at least 80%.

In step S1260, the PDSCH may be assigned through self-carrier scheduling or cross-carrier scheduling. When the PDSCH is assigned through self-carrier scheduling, the eNB counts DTX, NACK/DTX or ANY states of HARQ-ACK information fed back thereto as NACK. If the PDSCH is assigned through cross-carrier scheduling, the eNB counts NACK/DTX and ANY states of the HARQ-ACK information as NACK and does not count the DTX state thereof as NACK.

If HARQ-ACK information is bundled over M subframes (M≥2) and the bundled HARQ-ACK information is received, the eNB can regard the bundled HARQ-ACK information as M HARQ-ACK responses. Here, it is desirable that bundled M subframes include a reference subframe.

3. Proposed Embodiments

The present invention proposes a method through which a UE recognizes a resource pattern applied to a current CSI measurement resource through blind detection or dynamic signaling and performs CSI measurement when an eNB or the UE performs LBT based signal transmission and the eNB transmits CSI measurement resources (e.g., CRS/CSI-RS/CSI-IM) using one of a plurality of resource patterns in a wireless communication system including the eNB and the UE.

In an LAA system proposed by the present invention, an ending partial subframe including a transmission time interval (TTI) shorter than 1 ms is proposed. The ending partial subframe can serve to provide a space for performing LBT for a transmission (TX) burst following a currently transmitted TX burst or to support data transmission even when a channel observation time (COT) of the currently transmitted TX burst is shorter than 1 ms.

FIG. 13 is a diagram for comparison between a case in which the ending partial subframe is applied and a case in which the ending partial subframe is not applied.

In FIG. 13a, the ending partial subframe is not applied and thus all TX bursts are ended at the end boundaries of subframes. On the other hand, in FIG. 13b, the ending partial subframe is applied and thus TX bursts corresponding to SF #(n+4) and SF #(n+8) can be ended prior to the end boundaries of the subframes. In other words, the eNB can transmit TX bursts only in some OFDM symbols instead of all OFDM symbols for SF #(n+4) and SF #(n+8).

When the ending partial subframe is applied, the number of OFDM symbols available for reference signal transmission in a relevant subframe varies. Accordingly, different CRS/DM-RS/CSI-RS/CSI-IM patterns depending on ending partial subframe structures are proposed (Here, CSI-RS/CSI-IM is based on 8 ports). In this way, the ending partial subframe can conform to the downlink pilot time slot (DwPTS) structure corresponding to the special subframe structure of LTE. Hereinbelow, DwPTS_N means a DwPTS having a length of N OFDM symbols.

The present invention proposes 8 embodiments as configurations (e.g., the number) of OFDM symbols through which an eNB transmits TX bursts to a UE and CSI measurement resource patterns depending thereon. However, the 8 embodiments are examples for describing the present invention and a larger number of configurations may be applied according to embodiments of the present invention.

FIG. 14 illustrates CSI resource patterns for 8 OFDM symbol configurations according to an embodiment of the present invention. Here, an OFDM symbol configuration may mean the number of consecutive OFDM symbols associated with CSI measurement or the positions of the OFDM symbols associated with CSI measurement. Otherwise, an OFDM symbol configuration may refer to the number of OFDM symbols through which an eNB transmits data (e.g., TX burst) to a UE. Hereinafter, embodiments including all the aforementioned cases will be described.

Figure 14A:
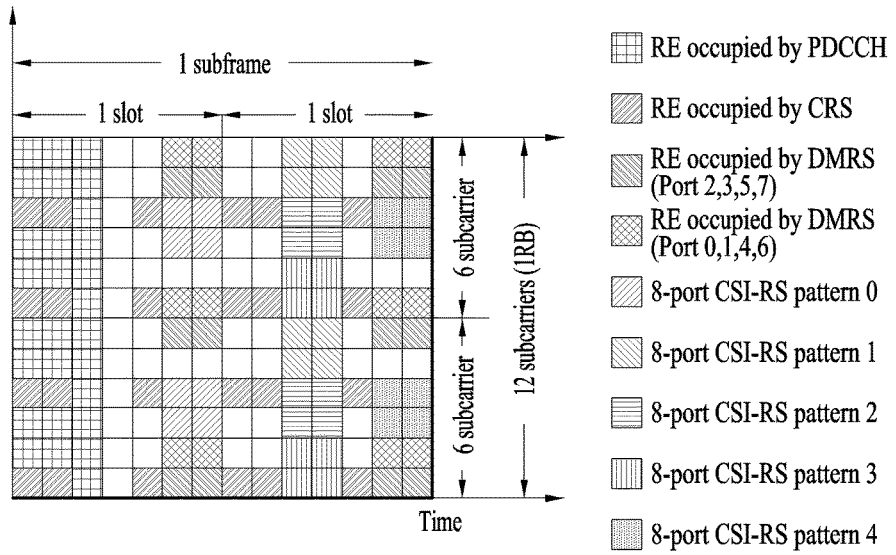
FIGS. 14A-14H illustrate CSI resource patterns for 8 OFDM symbol configurations according to embodiments of the present invention.

FIG. 14A illustrates a CRS/DM-RS/CSI-RS/CSI-IM pattern (CSI-RS/CSI-IM are 8-port basis) in a normal subframe (i.e., full subframe) in LTE. Although a configuration in which a PDCCH is allocated to OFDM symbols #0 to #2 from among OFDM symbols #0 to #13 is illustrated, the PDCCH may be allocated to only OFDM symbol #0 or to only OFDM symbols #0 and #1.

Although a UE assumes that CSI-RS/CSI-IM resources are not valid in DwPTS subframes in LTE Rel-12, the UE proposed by the present invention assumes that CSI-RS/CSI-IM resources are valid even in DwPTS subframes. CRS/DM-RS/CSI-RS/CSI-IM patterns according to the present invention are as follows.

Figure 14B:
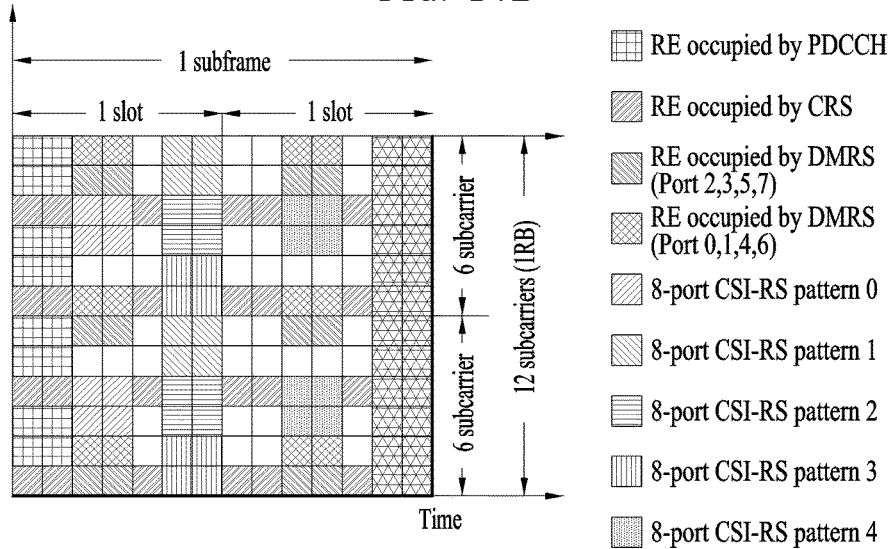

FIG. 14B illustrates a CRS/DM-RS/CSI-RS/CSI-IM pattern (CSI-RS/CSI-IM are based on 8 ports) in a DwPTS_12 configuration.

Figure 14C:
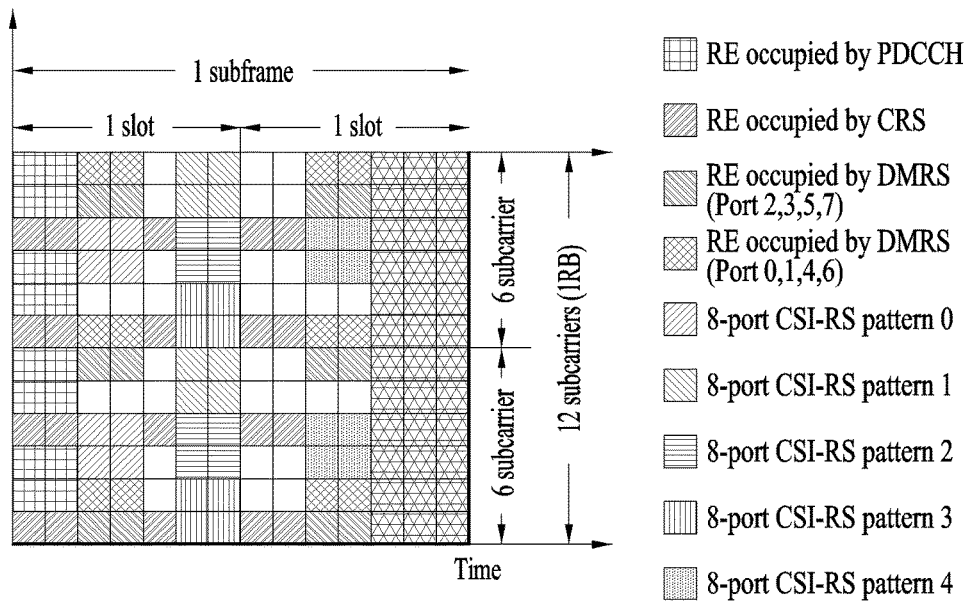

FIG. 14C illustrates a CRS/DM-RS/CSI-RS/CSI-IM pattern (CSI-RS/CSI-IM are based on 8 ports) in a DwPTS_11 configuration.

Figure 14D:
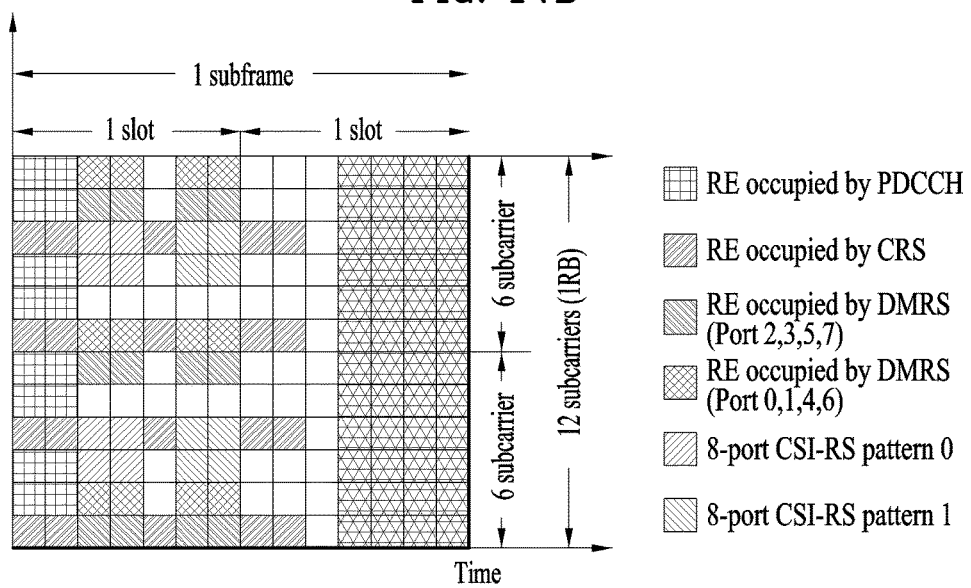

FIG. 14D illustrates a CRS/DM-RS/CSI-RS/CSI-IM pattern (CSI-RS/CSI-IM are based on 8 ports) in a DwPTS_10 configuration.

Figure 14E:
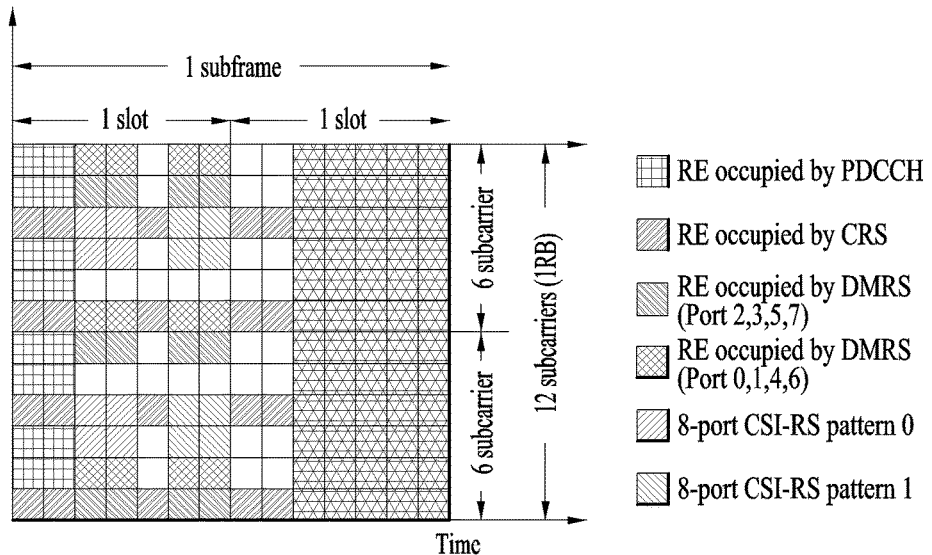

FIG. 14E illustrates a CRS/DM-RS/CSI-RS/CSI-IM pattern (CSI-RS/CSI-IM are based on 8 ports) in a DwPTS_9 configuration.

Figure 14F:
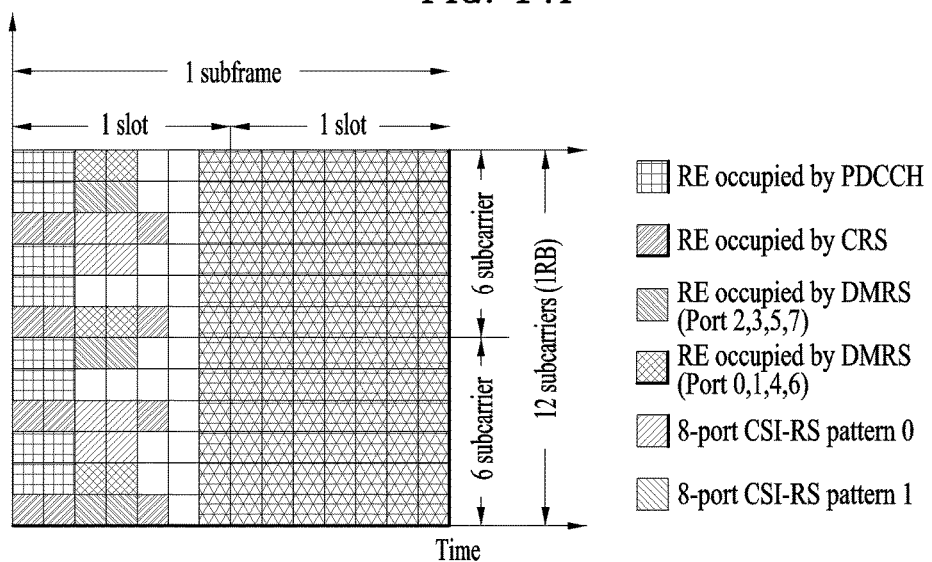

FIG. 14F illustrates a CRS/DM-RS/CSI-RS/CSI-IM pattern (CSI-RS/CSI-IM are based on 8 ports) in a DwPTS_6 configuration.

Figure 14G:
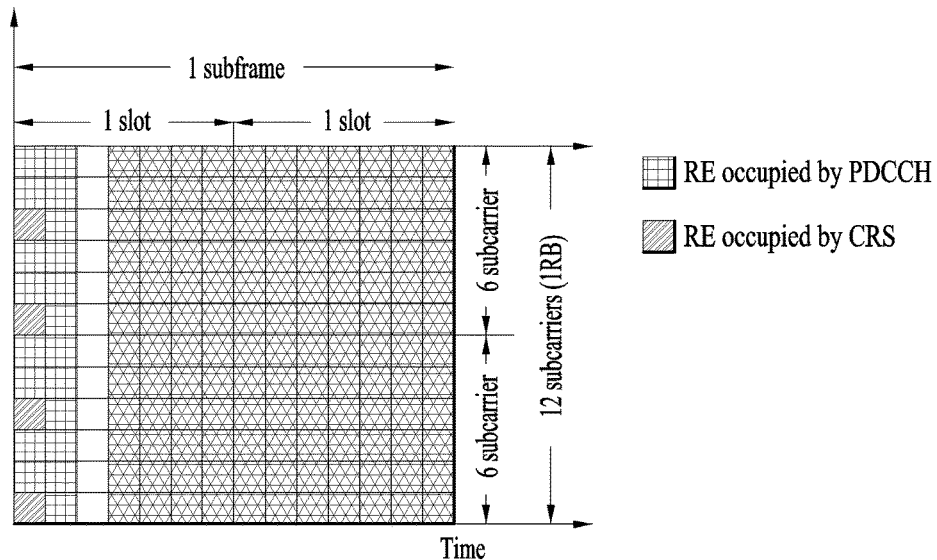

FIG. 14G illustrates a CRS/DM-RS/CSI-RS/CSI-IM pattern (CSI-RS/CSI-IM are based on 8 ports) in a DwPTS_3 configuration.

Figure 14H:
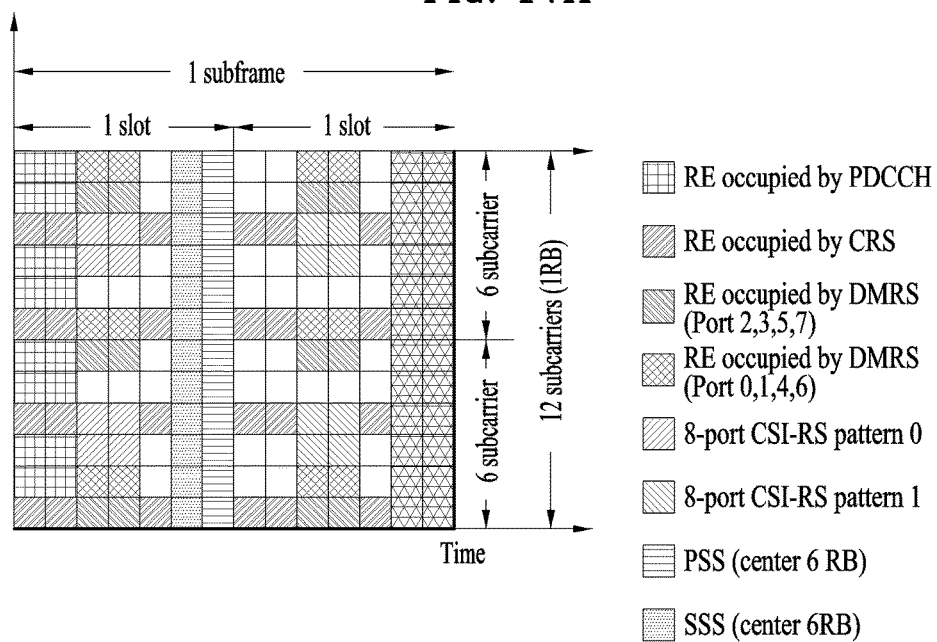

FIG. 14H illustrates a CRS/DM-RS/CSI-RS/CSI-IM pattern (CSI-RS/CSI-IM are based on 8 ports) in a DRS only subframe configuration. FIG. 14H shows a subframe configuration in which a PSS (Primary Synchronization Signal)/SSS (Secondary Synchronization Signal) included in a DRS are included in OFDM symbols #5 and #6 from among OFDM symbols #0 to #13. The PSS/SSS can be allocated only to center 6 RBs in the entire frequency band and are not allocated to the remaining frequency band as in FIG. 14B. Accordingly, a "DRS only" configuration refers to a configuration in which consecutive OFDM symbols associated with CSI measurement are #0 to #11 but a PSS and an SSS are assigned to OFDM symbols #5 and #6 in center 6 RBs in the entire frequency band in the following description.

As illustrated in FIGS. 14A to 14H, the CRS/DM-RS/CSI-RS/CSI-IM resource pattern can be determined depending on a duration of TX burst transmission from the eNB to the UE or a configuration expected to be used for TX burst transmission from the eNB to the UE. Here, a CSI-RS pattern number in DwPTS_6/11/12 and a CSI-RS pattern number in DwPTS_9/10 in a single CSI-RS configuration may be assigned as different values to the resource pattern.

In the LAA system, the UE can perform CSI measurement in a subframe in which downlink transmission is detected and CRS/CSI-RS/CSI-IM is present from among previous subframes on the basis of a CSI reference resource (i.e., the earliest time (set by the eNB for the UE) when the UE can use the CRS/CSI-RS/CSI-IM for CSI measurement).

As illustrated in FIGS. 14A to 14H, CSI resource patterns for OFDM configurations or subframe configurations can be divided into three resource patterns of {Full SF, DwPTS_6/11/12, DwPTS_9/10}. Accordingly, the UE according to the present invention needs to determine a resource pattern in which CSI measurement resources (e.g., CRS/CSI-RS/CSI-IM) are transmitted.

Therefore, the present invention proposes a method through which the UE recognizes a resource pattern applied to a current CSI measurement resource through blind detection or dynamic signaling and performs CSI measurement when the eNB transmits CSI measurement resources (e.g., CRS/CSI-RS/CSI-IM) using one of a plurality of resource patterns. A description will be given of operations in an LTE system as a specific embodiment of the present invention. However, the operations according to the present invention can be extended and applied to any wireless communication system performing LBT operation.

In the following description, a CSI measurement resource can refer to one of CRS/CSI-RS/CSI-IM. In addition, a valid subframe can be interpreted as a subframe in which a CSI measurement resource used for the UE to perform CSI measurement is transmitted.

[Proposed method #1] A method through which the eNB previously (one-to-one) matches a combination of a specific RS (e.g., CRS) sequence and a resource pattern to a resource pattern for a CSI measurement resource when the eNB can apply one of the plurality of resource patterns for CSI measurement resources and the UE detects the combination of the specific RS sequence and the resource pattern to determine the resource pattern for the CSI measurement resource For example, the UE according to an embodiment of the present invention can discriminate resource patterns for CRS/CSI-RS/CSI-IM according to CRS sequence type and a time index of an OFDM symbol from which a CRS (port 0) is detected as follows. Here, sequence type A refers to a type in which a sequence is discriminated per subframe index and sequence type B refers to a type in which a sequence may not be discriminated per subframe index. In the following table 3, TTI (transmission time interval) type can represent that a subframe is a full subframe or an ending partial subframe.

TABLE 3

| Option | Sequence Type | Time index for OFDM symbol | SF Type | TTI Type |
|---|---|---|---|---|
| 0 | Type A | 0 | Non-MBSFN | DwPTS_3 |
| 1 | Type A | 0, 4 | Non-MBSFN | DwPTS_6 |
| 2 | Type A | 0, 4, 7 | Non-MBSFN | DwPTS_9/10 DwPTS_11 |
| 3 | Type A | 0, 4, 7, 11 | Non-MBSFN | DwPTS_12 Full SF DRS only |
| 4 | Type B | 0, 4, 7, 11 | Non-MBSFN | DRS only |

A CSI measurement resource pattern per option may be the same as those shown in FIGS. 14A to 14H.

Here, DRS only refers to a case in which a DRS (discovery signal) composed of a CRS, PSS/SSS and CSI-RS is transmitted for shorter than 1 ms (e.g., 12 OFDM symbols) without a PDSCH. In this case, a resource pattern can be defined as illustrated in FIG. 14H.

An MBSFN (Multicast Broadcast Single Frequency Network) subframe is a subframe structure for supporting MBMS (multimedia broadcast and multicast service) and refers to a subframe in which a CRS may not be transmitted in a region other than a control region (e.g., a PDCCH region) composed of first two OFDM symbols.

Although Table 3 classifies resource patterns for CSI measurement resources, which can be identified according to CRS detection, a plurality of resources patterns for a CSI measurement resource may be present for a combination of a specific sequence for the CRS and a resource pattern according to a specific option such as Option #2. In this case, it is difficult for the UE to determine a resource pattern in which a CSI measurement resource is transmitted.

Accordingly, a combination of a specific sequence for the CRS and a resource pattern in Table 3 can be configured to indicate only a single resource pattern when the UE recognizes or determines a CSI measurement resource pattern. That is, one-to-one matching can be set. Here, the following methods may be considered.

(1) Omission of Part of TTI Types

For example, DwPTS_11 from among available TTI types in Option #2 of Table 3 can be excluded. Accordingly, ambiguity with respect to Option #2 can be eliminated.

(2) Application of the Same Resource Pattern to CSI Measurement Resources in a Plurality of TTI Types.

For example, the same resource pattern within 12 OFDM symbols is applied to CSI measurement resources in the case of DwPTS_12, full SF and DRS only. In this case, the UE can recognize or determine a CSI measurement resource pattern and perform CSI measurement without discriminating the resource patterns of the aforementioned three cases.

Additionally, the eNB may not configure CSI-IM resources that cannot be detected by the UE in OFDM symbols #12 and #13 all the time. Accordingly, the UE can assume that the CSI-IM is not configured in OFDM symbols #12 and #13. Here, when a relevant TTI type is one of DwPTS_12, full SF and DRS only, the UE determines that only CSI-IM in OFDM symbols #12 and #13 is not valid from among resource patterns for CRS/CSI-RS/CSI-IM in a full subframe, and may detect CSI-RS resources through blind detection and use the CSI-RS resources for CSI measurement.

[Proposed method #2] A method through which the UE assumes that a CSI measurement resource is present between timings of detection of a specific RS (e.g., CRS) within one transmission unit (e.g., subframe) when the eNB can apply one of a plurality of resource patterns for CSI measurement resources or a method through which the UE determines that only a CSI measurement resource within the shortest subframe duration corresponding to the number of symbols carrying the specific RS is valid.

As illustrated in FIGS. 14A to 14H, the UE can recognize or determine a resource pattern for a CSI measurement resource in an ending partial subframe in consideration of CRS or DM-RS positions in DwPTS. Here, [Proposed method #2] determines that only a CSI measurement resource positioned between detected specific RSs is valid.

For example, when the cases of FIGS. 14B and 14C are compared with each other, the UE can detect the CRS from OFDM symbols #0, #1, #4, #7, #8 and #11 in FIG. 14B, whereas the UE can detect the CRS from OFDM symbols #0, #1, #4, #7 and #8 in FIG. 14C. Here, the UE can determine that CSI-RS resources corresponding to OFDM symbols #2, #3, #5, #6, #9 and #10 are valid in FIG. 14B, whereas the UE can determine that CSI-RS resources corresponding to OFDM symbols #2, #3, #5 and #6 are valid in FIG. 14C.

Alternatively, a resource pattern for a CSI measurement resource in an ending partial subframe may be determined using a resource pattern for a CSI measurement resource defined for a full subframe. For example, a resource pattern for a CSI measurement resource in the ending partial subframe may be defined in such a manner that CSI measurement resources positioned at OFDM symbols behind a CSI measurement resource pattern defined for the full subframe are truncated.

In this way, the UE can estimate the duration of the ending partial subframe through CRS detection and infer the resource pattern for the CSI measurement resource on the basis of the estimation result. Accordingly, the present invention proposes a method through which the UE detects transmission positions or the number of symbols with respect to the CRS to recognize the duration of the corresponding ending partial subframe and assumes a resource pattern of a CSI measurement resource corresponding to the duration of the ending partial subframe.

[Proposed method #3] A method through which the UE assumes a specific resource pattern (e.g., a resource pattern in a full subframe) for a CSI measurement resource in an MBSFN subframe (or a subframe having CRSs only in some symbols of the front part thereof) when the eNB applies one of a plurality of resource patterns for CSI measurement resources and the UE recognizes a resource pattern for a CSI measurement resource based on CRS detection In this case, the eNB may configure only non-MBSFN subframes through higher layer signaling and configure the remaining subframes as potential MBSFM subframes. The UE can recognize whether a potential MBSFN subframe is an actual MBSFN subframe through detection of CRSs (on OFDM symbols #0 and #1) or dynamic signaling from the eNB.

In the LTE Rel-13 LAA system, a method of dynamically configuring an MBSFN subframe in consideration of more flexible resource utilization is under discussion. Dynamic configuration of the MBSFN subframe by the eNB may be another option of change of a resource pattern of a CSI measurement resource (from the viewpoint of the CRS).

Here, even if there is no dynamic signaling indicating that a specific subframe is an MBSFN subframe, the UE can recognize whether the specific subframe is an MBSFN subframe by detecting or using a specific RS (e.g. CRS). However, it may be difficult for the UE to recognize a TTI type (whether a subframe structure is a full subframe or a partial subframe) and a TTI length in a partial subframe only through detection of the specific RS (e.g., CRS) without dynamic signaling.

Accordingly, the present invention proposes modification of Option #0 of Table 3 as shown in the following table 4 such that the UE according to an embodiment of the present invention can identify an MBSFN subframe using the specific RS (e.g., CRS).

TABLE 4

| Option | Sequence Type | Time index for OFDM symbol | SF Type | TTI Type |
| --- | --- | --- | --- | --- |
| 0 | Type A | 0 | MBSFN | Full SF |

In another embodiment, a CRS sequence in an MBSFN subframe may be set differently from that in a non-MBSFN subframe. In this case, the UE can determine whether a specific subframe is an MBSFN subframe by detecting a CRS sequence.

In another embodiment, the eNB may quasi-statically set whether a specific subframe is an MBSFN subframe through higher layer signaling such as RRC signaling. Here, although the CRS is present only in OFDM symbols #0 and #1 in the MBSFN subframe, in general, the DRS may be exceptionally transmitted even in the MBSFN subframe. When the DRS is transmitted in the MBSFN subframe, the CRS can be transmitted in the same format as in a non-MBSFN subframe.

[Proposed method #3.1] A method of ensuring constant presence of a specific CSI-RS/CSI-IM configuration irrespective of a plurality of resource patterns for CSI measurement resources when the eNB can apply one of the plurality of resource patterns for CSI measurement resources.

For example, a CSI measurement resource pattern transmitted by the eNB in a specific subframe (e.g., full subframe or ending partial subframe) can be determined on the basis of DM-RS positions in DwPTS, as illustrated in FIGS. 14A to 14H. In this case, the eNB can define a CSI-RS/CSI-IM resource of which transmission is guaranteed all the time using REs other than REs in which the DM-RS can be positioned, irrespective of whether the specific subframe is a full subframe or a partial subframe, and notify the UE of the defined CSI-RS/CSI-IM resource. Here, the UE may assume that downlink transmission is present all the time for the CSI-RS/CSI-IM configuration guaranteed by the eNB if downlink transmission is present and may not skip an additional detection procedure therefor.

Otherwise, if downlink transmission in a specific subframe is ensured, the UE can assume that the CSI-RS/CSI-IM configuration appointed between the UE and the eNB (or predetermined by the eNB) is valid all the time.

[Proposed method #3.2] A method of defining a CSI-RS/CSI-IM configuration composed of REs other than REs corresponding to a plurality of DM-RS patterns in a subframe when the eNB can apply one of the plurality of DM-RS patterns.

For example, a CSI measurement resource pattern transmitted by the eNB in a specific subframe (e.g., full subframe or ending partial subframe) can be determined on the basis of DM-RS positions in DwPTS, as illustrated in FIGS. 14A to 14H. In this case, the eNB can define a CSI-RS/CSI-IM resource using REs other than REs in which the DM-RS can be positioned and notify the UE of the defined CSI-RS/CSI-IM resource.

[Proposed method #4] A method through which the eNB directly signals a resource pattern to be applied to a CSI measurement resource to the UE through dynamic signaling in a specific subframe or signals candidates of a resource pattern to be applied to a CSI measurement resource when the eNB can apply one of a plurality of resource patterns for CSI measurement resources As illustrated in FIGS. 14A to 14H, when a CSI measurement resource pattern is set on the basis of the length of a TX burst transmitted from the eNB to the UE (e.g., DWPTS structure or configuration, or the number or configuration of OFDM symbols associated with CSI measurement), the eNB can signal a resource pattern applicable to a CSI measurement resource to the UE through dynamic signaling.

The aforementioned technical configuration is applicable to various embodiments. For example, when the eNB transmits data (e.g., TX burst) to the UE through only some OFDM symbols of a specific subframe, the eNB can signal, to the UE, the length of the OFDM symbols through which the data is transmitted and a CSI measurement resource pattern corresponding thereto.

Alternatively, the eNB may transmit data to the UE through N OFDM symbols of a specific subframe and configure a CSI measurement resource pattern for the specific subframe on the basis of a subframe structure in which the data is transmitted through M (M<N) OFDM symbols. In this case, the eNB can signal that the CSI measurement resource pattern has been set on the basis of a state in which the data is transmitted through M OFDM symbols or a state in which the number of consecutive OFDM symbols associated with CSI measurement is M through dynamic signaling although the eNB transmits the data through N OFDM symbols.

As such dynamic signaling, indicators of various sizes are applicable. For example, the eNB can signal information about a resource pattern or a subframe configuration applicable to a CSI measurement resource to the UE through 3-bit dynamic signaling.

TABLE 5

| State | CRS/CSI-RS/CSI-IM pattern |
|---|---|
| 000 | DwPTS_6 |
| 001 | DwPTS_9/10 |
| 010 | DwPTS_11/12 |
| 011 | Full SF |
| 100 | DRS only |
| 101 | Reserved |

TABLE 5-continued

| State | CRS/CSI-RS/CSI-IM pattern |
|---|---|
| 110 | Reserved |
| 111 | Reserved |

The UE can recognize or determine a CSI measurement resource pattern applied to a specific subframe by receiving dynamic signaling indicating one of the states shown in Table 5 from the eNB. Here, a CSI measurement resource pattern corresponding to each state may be configured as illustrated in FIGS. 14A to 14H.

Although a method of discriminating "DRS only" from other states in the above-mentioned embodiment, the eNB may signal only states other than "DRS only" to the UE in other embodiments. To this end, the eNB can equally apply a resource pattern of a CSI measurement resource, applied to a state other than "DRS only", to a "DRS only" subframe. Otherwise, the eNB may signal a DRS only case and a DwPTS_11/12 case for a specific subframe as an identical state and the UE may determine DRS only when a PSS/SSS is detected from the specific subframe and determines DwPTS_11/12 when a PSS/SSS is not detected from the specific subframe.

In another embodiment, the eNB may signal only information about a group to which a resource pattern for a CSI measurement resource belongs instead of signaling the resource pattern for the CSI measurement resource. For example, the eNB can signal, to the UE, whether a specific subframe is a full subframe or a partial subframe through 1-bit signaling, as shown in Table 6.

TABLE 6

| State | CRS/CSI-RS/CSI-IM pattern |
|---|---|
| 0 | Full SF |
| 1 | Partial SF |

Here, when the UE receives the 1-bit signaling indicating that a specific subframe is a partial subframe, the UE can detect a partial subframe structure corresponding to an applied CSI measurement resource pattern from among a plurality of partial subframe structures. To this end, the UE can detect the CSI measurement resource pattern applied to the specific subframe using blind detection based methods such as CRS detection proposed in [Proposed method #1] and [Proposed method #2].

[Proposed method #5] A method through which the eNB signals, to the UE, presence or absence of a CSI measurement resource in a specific subframe (whether the specific subframe is a valid subframe from the viewpoint of CSI measurement) through dynamic signaling and the UE assumes a specific resource pattern (e.g., a resource pattern in a full subframe for the CSI measurement resource) for the CSI measurement resource when presence of the CSI measurement resource is signaled thereto

[Proposed method #5] is a modification of [Proposed method #4]. According to [Proposed method #5], the eNB can signal, to the UE, whether the current subframe is a full subframe or a partial subframe and additionally instruct the UE not to perform CSI measurement in the current subframe when the current subframe is a partial subframe.

In other words, the eNB according to the present invention can signal whether a specific subframe is valid for CSI measurement (i.e., whether a CSI measurement resource is valid for the specific subframe) and the UE can assume that a CSI measurement resource conforming to a specific resource pattern has been transmitted only for a subframe signaled as being valid. Here, the specific resource pattern may be determined as follows.

(1) Resource pattern for a CSI measurement resource in a full subframe (2) Resource pattern for a CSI measurement resource defined within 12 OFDM symbols

[Proposed method #6] When the UE receives dynamic signaling from the eNB and uses information about a CSI measurement resource in the dynamic signaling for CSI measurement, the eNB can designate a time when the dynamic signaling is transmitted through higher layer signaling. The UE can operate as follows when the dynamic signaling is not detected.

(1) The LTE does not perform CSI measurement for subframes to which the dynamic signaling is applied.

(2) The UE detects or determines a CSI measurement resource pattern transmitted through a specific subframe using one of [Proposed method #1] and [proposed method #2].

(3) The UE applies a default configuration designated between the UE and the eNB for at least one of the following items.

Transmission power (TXP) for a CSI measurement resource

Resource pattern for the CSI measurement resources

Sequence applied to the CSI measurement resource (4) When a plurality of resource patterns are present for the CSI measurement resource, CSI measurement is performed using only CRS/CSI-RS/CSI-IM resources present all the time for all resource patterns.

When the eNB delivers information related to CSI measurement to the UE through dynamic signaling, the present invention proposes operations of the UE when the dynamic signaling is not received.

The eNB may set a time when dynamic signaling is transmitted through higher layer signaling such as RRC signaling. Positions of subframes to which the dynamic signaling is applied may be previously appointed between the eNB and the UE. Here, the UE can perform CSI measurement in the subframes using information about a CSI measurement resource received through dynamic signaling.

In an embodiment of the present invention, when the UE does not receive the dynamic signaling at the preset time, the UE may not perform CSI measurement for subframes appointed as subframes to which dynamic signaling will be applied.

In another embodiment of the present invention, when the UE does not receive the dynamic signaling at the present time, the UE may detect information about the CSI measurement resource (e.g., pattern) on the basis of blind detection performed thereby and perform CSI measurement using [proposed method #1] or [proposed method #2].

In another embodiment of the present invention, when the UE does not receive the dynamic signaling at the present time, the UE may perform CSI measurement upon assuming that a CSI measurement resource pattern previously appointed between the eNB and the UE is applied to subframes appointed as subframes to which dynamic signaling will be applied.

In another embodiment of the present invention, when the UE does not receive the dynamic signaling at the present time, the UE may perform CSI measurement using only a CSI measurement resource pattern that is valid all the time for subframes appointed as subframes to which dynamic signaling will be applied.

[Proposed method #7] A method through which the UE determines, a subframe, which has been determined to be a partial subframe, to be a valid subframe for CSI measurement, that is, a method through which the UE does not perform CSI measurement in a subframe determined to be a partial subframe.

The UE may assume that no CSI measurement resource is present in a subframe determined or signaled as a partial subframe. According to this operation, the UE may only recognize whether a specific subframe is a full subframe or a partial subframe and need not detect a resource pattern corresponding to a CSI measurement resource pattern from among a plurality of resource patterns. Here, the UE can use dynamic signaling received from the eNB to recognize whether a specific subframe is a full subframe or a partial subframe.

In an additional embodiment, when the specific subframe is a partial subframe, the eNB can signal, to the UE, whether CSI measurement is performed in the partial subframe through higher layer signaling.

[Proposed method #8] A method through which the eNB sets whether a CSI measurement resource can be used in a subframe in which a DRS is transmitted for the UE through higher layer signaling and the UE uses the CSI measurement resource in the subframe in which the DRS is transmitted depending on capability thereof The present invention proposes a method through which the eNB transmits a CSI-RS resource to the UE in a subframe in which a DRS is transmitted and the UE uses the CSI-RS resource for CSI measurement.

Here, sequences of some RSs such as CRSs included in the DRS may not conform to the subframe index. Otherwise, sequences of some RSs such as CRSs included in the DRS may not be based on the subframe index.

Accordingly, the UE needs to perform blind detection for both a case in which a sequence of CRSs or specific RSs conforms to the subframe index (sequence type A in [Proposed method #1]) and a case in which the sequence of CRSs or specific RSs does not conform to the subframe index (sequence type B in [Proposed method #1]) in order to use the CSI measurement resource in the subframe in which the DRS is transmitted. Accordingly, the eNB may notify the UE only of whether the CSI measurement resource can be used in the subframe in which the DRS is transmitted and the UE may determine whether to measure CSI using the CSI measurement resource in the subframe in which the DRS is transmitted.

[Proposed method #9] This is a method through which the UE regards an MBSFN subframe as a valid subframe for CSI measurement (or includes an MBSFN subframe in valid subframes for CSI measurement) if a CRS transmission band has a predetermined size or larger when the UE perform CRS based CSI measurement. Accordingly, the UE can perform CSI measurement in the MBSFN subframe.

In LTE Rel-12, a UE performing CRS based CSI measurement excludes the MBSFN subframe from valid subframes for CSI measurement. However, in the LAA system in which the system bandwidth is assigned 25 RBs (resource blocks) or more in many cases, even the MBSFN subframe in which CRSs are transmitted only in OFDM symbols #0 and #1 may have enough CRS resources, which can be detected in the frequency domain, to perform CSI measurement if the system bandwidth is wide. Accordingly, the present invention proposes a method through which a UE performing CRS based CSI measurement includes the MBSFN subframe in valid subframes for CSI measurement when the bandwidth in which the CRS is transmitted is sufficiently wide.

[Proposed method #10] A method through which the UE assumes that a specific resource pattern for a CSI measurement resource is always valid for a specific subframe index set A method of transmitting a DRS all the time in subframes corresponding to subframe indices #0 and #5 when downlink transmission is present for subframe indices #0 and #5 to secure synchronization performance was discussed in an LTE Rel 13 LAA system. Accordingly, the present invention proposes a method of fixing resource patterns for CSI measurement resources of subframes that ensure DRS transmission. Therefore, the UE can detect a CSI measurement resource pattern in the subframes corresponding to subframe indices #0 and #5 without an additional detection procedure. Additionally, the UE may assume that CSI measurement resources within OFDM symbols #0 to #11 are always present or CSI measurement resources are present in a previously set pattern when downlink transmission is present for SF indices #0 and #5.

[Proposed method #11] A method through which the UE determines that all CSI-RS or CSI-IM resources configured therefor are valid in a specific subframe corresponding to an aperiodic CSI triggering time Here, a CRS in a full subframe or a CRS of a minimum of N symbols can be assumed to be valid.

The eNB can instruct the UE to send CSI report through aperiodic CSI triggering. Here, the UE can assume that CSI-RS and/or CSI-IM resources of a subframe triggered by the eNB to be used for CSI measurement are valid because the UE can interpret the operation of the eNB as operation of ensuring the CSI-RS and/or CSI-IM resources for the subframe triggered to be used for CSI measurement.

In addition, the eNB can set whether to perform measurement restriction (MR) for restricting execution of CSI measurement of the UE only for subframes within a predetermined time from a CSI reference. Here, the UE can assume that CSI-RS or CSI-IM resources configured therefor are present in subframes (at least subframes in which downlink transmission is detected) to which MR is set when the UE receives aperiodic CSI triggering from the eNB.

In the case of a UE configured to perform CRS based CSI measurement, when the UE determines a specific subframe corresponding to an aperiodic CSI triggering time to be an MBSFN subframe or an invalid subframe, the UE can perform CSI measurement in a non-MBSFN subframe or valid subframe adjacent to the specific subframe (without authentication or detection of downlink transmission).

4. Configuration of Devices

Figure 15:
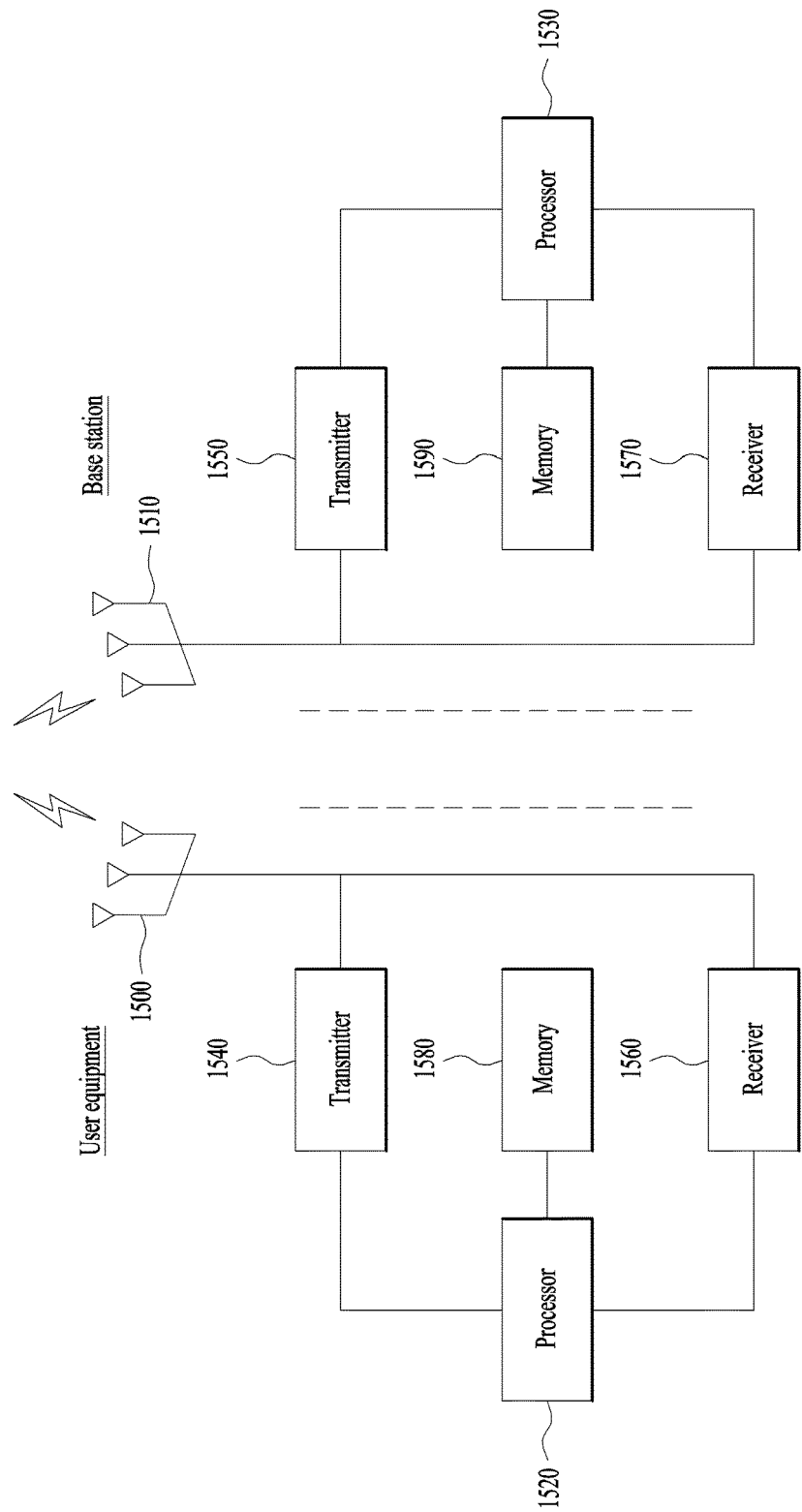
FIG. 15 illustrates configurations of a UE and a BS capable of implementing embodiments proposed by the present invention.

FIG. 15 illustrates configuration of a UE and a BS capable of implementing the proposed embodiments. The UE and the BS shown in FIG. 15 operate to implement the aforementioned CSI reporting methods.

A UE may act as a transmission end on a UL and as a reception end on a DL. A BS may act as a reception end on a UL and as a transmission end on a DL.

That is, each of the UE and the BS may comprise a Transmitter (Tx) 1540 or 1550 and Receiver (Rx) 1560 or 1570, for controlling transmission and reception of information, data, and/or messages, and an antenna 1500 or 1510 for transmitting and receiving information, data, and/or messages.

Each of the UE and the BS may further include a processor 1520 or 1530 for implementing the afore-described embodiments of the present invention and a memory 1580 or 1590 for temporarily or permanently storing operations of the processor 1520 or 1530.

The transmitters and receivers included in the UE and the BS may execute packet modulation and demodulation functions for data transmission, a fast packet channel coding function, OFDMA (Orthogonal Frequency Division Multiple Access) packet scheduling, TDD (Time Division Duplex) packet scheduling and/or a channel multiplexing function. In addition, the UE and the BS shown in FIG. 15 may further include RF (Radio Frequency)/IF (Intermediate Frequency) units.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1580 or 1590 and executed by the processor 1540 or 1530. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

Furthermore, the proposed method is applicable to an mmWave communication system using microwave frequencies.

What is claimed is:

1. A method of measuring channel state information (CSI) by a user equipment (UE) in a wireless communication system supporting unlicensed bands, the method comprising:

receiving, by the UE from an evolved Node B (eNB), CSI resource configuration information indicating one of a plurality of CSI measurement resource patterns;

determining, by the UE, a CSI measurement resource pattern based on the CSI resource configuration information, wherein each of the plurality of CSI measurement resource patterns has different patterns, respectively, according to a last symbol position of orthogonal frequency division multiplexing (OFDM) symbols occupied by each of the plurality of CSI measurement resource patterns in one subframe; and measuring, by the UE, CSI for one or more subframes using the determined CSI measurement resource pattern.

2. The method of claim 1, wherein CSI measurement resources of the plurality of CSI measurement resource patterns comprise one or more of cell specific reference signal (CRS), channel state information-reference signal (CSI-RS) and channel state information-interference measurement (CSI-IM) resources.

3. The method of claim 2, wherein each of the one or more subframes comprises OFDM symbols #0 to #13 in a time domain, and subcarriers #0 to #11 in a frequency domain, wherein the plurality of CSI measurement resource patterns comprises:

a first CSI measurement resource pattern comprising the CSI-RS resource allocated to subcarriers #2, #3, #8 and #9 on OFDM symbols #2 and #3 of each of the one or more subframes, a second CSI measurement resource pattern comprising the CSI-RS resource allocated to subcarriers #2, #3, #8 and #9 on OFDM symbols #2 and #3 and subcarriers #2, #3, #8 and #9 on OFDM symbols #5 and #6 of each of the one or more subframes, a third CSI measurement resource pattern comprising the CSI-RS resource allocated to subcarriers #2, #3, #8 and #9 on OFDM symbols #2 and #3 , subcarriers #0 to #11 on OFDM symbols #5 and #6 and subcarriers #2, #3, #8 and #9 on OFDM symbols #9 and #10 of each of the one or more subframes, and a fourth CSI measurement resource pattern comprising the CSI-RS resource allocated to subcarriers #2, #3, #8 and #9 on OFDM symbols #5 and #6 , subcarriers #0 to #11 on OFDM symbols #9 and #10 and subcarriers #2, #3, #8 and #9 on OFDM symbols #12 and #13 of each of the one or more subframes.

4. The method of claim 2, wherein, when the CSI resource configuration information is not received from the eNB, the UE measures a number of consecutive OFDM symbols carrying data transmitted in a subframe corresponding to a time appointed to receive the CSI resource configuration information on the basis of position information of a CRS detected in the subframe and measures CSI for the one or more subframes using a CSI measurement resource pattern determined on the basis of the measured number of consecutive OFDM symbols.

5. A method of measuring channel state information (CSI) by a user equipment (UE) in a wireless communication system supporting unlicensed bands, the method comprising:

receiving, by the UE from an evolved Node B (eNB), subframe configuration information indicating whether a specific subframe is a partial subframe carrying data transmitted only through some orthogonal frequency division multiplexing (OFDM) symbols;

when the subframe configuration information indicates that the specific subframe is the partial subframe, the method further comprising:

measuring, by the UE, a length of data transmitted from the eNB in the specific subframe based on position information of a cell specific reference signal (CRS) detected in the specific subframe, determining, by the UE, a CSI measurement resource pattern based on the measured data length, and measuring, by the UE, CSI for one or more subframes including the specific subframe using the determined CSI measurement resource pattern; and when the subframe configuration information indicates that the specific subframe is not the partial subframe, the method further comprising:

determining, by the UE, a CSI measurement resource pattern as a predetermined CSI measurement resource pattern, and measuring, by the UE, CSI for one or more subframes including the specific subframe using the predetermined CSI measurement resource pattern.

6. The method of claim 5, wherein CSI measurement resources of the CSI measurement resource pattern comprise a channel state information-reference signal (CSI-RS) resource, wherein each of the one or more subframes includes OFDM symbols #0 to #13 in a time domain, wherein the CSI measurement resource pattern is determined as a CSI measurement resource pattern in which the CSI-RS resource is assigned to OFDM symbols #2 and #3 of each of the one or more subframes when the CRS is detected in OFDM symbols #0 and #4 of the specific subframe, wherein the CSI measurement resource pattern is determined as a CSI measurement resource pattern in which the CSI-RS resource is assigned to OFDM symbols #2, #3, #5 and #6 of each of the one or more subframes when the CRS is detected in OFDM symbols #0, #4 and #7 of the specific subframe, and wherein the CSI measurement resource pattern is determined as a CSI measurement resource pattern in which the CSI-RS resource is assigned to OFDM symbols #2, #3, #5, #6, #9 and #10 of each of the one or more subframes when the CRS is detected in OFDM symbols #0, #4, #7 and #11 of the specific subframe.

7. A user equipment (UE) for measuring channel state information (CSI) in a wireless communication system supporting unlicensed bands, the UE comprising:

a receiver; and a processor operating by being connected to the receiver, wherein the processor:

controls the receiver to receive, from an evolved Node B (eNB), CSI resource configuration information indicating one of a plurality of CSI measurement resource patterns, wherein each of the plurality of CSI measurement resource patterns has different patterns, respectively, according to a last symbol position of orthogonal frequency division multiplexing (OFDM) symbols occupied by each of the plurality of CSI measurement resource patterns in one subframe, and measures CSI for one or more subframes using a CSI measurement resource pattern indicated by the CSI resource configuration information.

8. The UE of claim 7, wherein CSI measurement resources of the plurality of CSI measurement resource patterns comprise one or more of cell specific reference signal (CRS), a channel state information-reference signal (CSI-RS) and channel state information-interference measurement (CSI-IM) resources.

9. The UE of claim 8, wherein each of the one or more subframes comprises OFDM symbols #0 to #13 in a time domain, and subcarriers #0 to #11 in a frequency domain, wherein the plurality of CSI measurement resource patterns comprises:

a first CSI measurement resource pattern comprising the CSI-RS resource allocated to subcarriers #2, #3, #8 and #9 on OFDM symbols #2 and #3 of each of the one or more subframes, a second CSI measurement resource pattern comprising the CSI-RS resource allocated to subcarriers #2, #3, #8 and #9 on OFDM symbols #2 and #3 and subcarriers #2, #3, #8 and #9 on OFDM symbols #5 and #6 of each of the one or more subframes, a third CSI measurement resource pattern comprising the CSI-RS resource allocated to subcarriers #2, #3, #8 and #9 on OFDM symbols #2 and #3 , subcarriers #0 to #11 on OFDM symbols #5 and #6 and subcarriers #2, #3, #8 and #9 on OFDM symbols #9 and #10 of each of the one or more subframes, and a fourth CSI measurement resource pattern comprising the CSI-RS resource allocated to subcarriers #2, #3, #8 and #9 on OFDM symbols #5 and #6 , subcarriers #0 to #11 on OFDM symbols #9 and #10 and subcarriers #2, #3, #8 and #9 on OFDM symbols #12 and #13 of each of the one or more subframes.

10. The UE of claim 8, wherein, when the processor does not receive the CSI resource configuration information from the eNB, the processor measures the number of consecutive OFDM symbols carrying data transmitted in a subframe corresponding to a time appointed to receive the CSI resource configuration information on the basis of position information of a CRS detected in the subframe and measures CSI for the one or more subframes using a CSI measurement resource pattern determined on the basis of the measured number of consecutive OFDM symbols.

11. A user equipment (UE) for measuring channel state information (CSI) in a wireless communication system supporting unlicensed bands, the UE comprising:

a receiver; and a processor operating by being connected to the receiver, wherein the processor:

controls the receiver to receive, from an evolved Node B (eNB), subframe configuration information indicating whether a specific subframe is a partial subframe carrying data transmitted only through some orthogonal frequency division multiplexing (OFDM) symbols, when the subframe configuration information indicates that the specific subframe is the partial subframe, measures a length of data transmitted from the eNB in the specific subframe on the basis of position information of a cell specific reference signal (CRS) detected in the specific subframe, determines a CSI measurement resource pattern based on the measured data length, and measures CSI for one or more subframes including the specific subframe using the determined CSI measurement resource pattern, when the subframe configuration information indicates that the specific subframe is not the partial subframe, determines a CSI measurement resource pattern as a predetermined CSI measurement resource pattern, and measures CSI for one or more subframes including the specific subframe using the predetermined CSI measurement resource pattern.

12. The UE of claim 11, wherein CSI measurement resources of the CSI measurement resource pattern comprise a channel state information-reference signal (CSI-RS) resource, wherein each of the one or more subframes includes OFDM symbols #0 to #13 in a time domain;

wherein the CSI measurement resource pattern is determined as a CSI measurement resource pattern in which the CSI-RS resource is assigned to OFDM symbols #2 and #3 of each of the one or more subframes when the CRS is detected in OFDM symbols #0 and #4 of the specific subframe;

wherein the CSI measurement resource pattern is determined as a CSI measurement resource pattern in which the CSI-RS resource is assigned to OFDM symbols #2, #3, #5 and #6 of each of the one or more subframes when the CRS is detected in OFDM symbols #0, #4 and #7 of the specific subframe; and wherein the CSI measurement resource pattern is determined as a CSI measurement resource pattern in which the CSI-RS resource is assigned to OFDM symbols #2, #3, #5, #6, #9 and #10 each of the one or more subframes when the CRS is detected in OFDM symbols #0, #4, #7 and #11 of the specific subframe.

* * * * *